United States Patent [19]

Sunagawa

[11] Patent Number: 4,945,527

[45] Date of Patent: Jul. 31, 1990

[54] OPTICAL PICKUP APPARATUS FOR DETECTION OF FOCUSING ERROR, TRACKING ERROR, AND INFORMATION

[75] Inventor: Hiroshi Sunagawa, Kanagawa, Japan

[73] Assignee: Fuji Photo Film Co., Ltd., Kanagawa, Japan

[21] Appl. No.: 251,479

[22] Filed: Sep. 30, 1988

[30] Foreign Application Priority Data

Sep. 30, 1987 [JP] Japan ................... 62-247319
Sep. 30, 1987 [JP] Japan ................... 62-247320
Sep. 30, 1987 [JP] Japan ................... 62-247321

[51] Int. Cl.⁵ .............................................. G11B 7/00
[52] U.S. Cl. ................... 369/44.11; 369/112; 369/13; 369/44.21; 250/201; 360/114; 350/96.12; 350/96.14
[58] Field of Search ............. 358/342; 250/201; 369/43–47, 13, 112, 120, 122; 360/114; 350/96.11, 96.12, 96.13, 96.14, 96.15

[56] References Cited

U.S. PATENT DOCUMENTS 4,672,187  6/1987  Fujita et al. ................ 369/45 X
4,797,867  1/1989  Sunagawa et al. ............ 369/45
4,833,561  5/1989  Sunagawa et al. .......... 369/45 X

*Primary Examiner*—Robert L. Richardson
*Attorney, Agent, or Firm*—Sughrue, Mion, Zinn, Macpeak & Seas

[57] ABSTRACT

An optical pickup apparatus comprises an objective lens for converging a light beam onto an optical recording medium, and a light guide disposed so that the surface thereof receives the light beam reflected by the optical recording medium. A focusing grating is provided on one surface of the light guide for introducing the reflected light beam into the light guide such that the reflected light beam advances by total reflection between the one surface and the other surface of the light guide, and converging the light beam thus guided in the light guide. A photodetector secured to the surface or an edge face of the light guide detects the guided light beam converged by the focusing grating. Tracking error, focusing error and signals recorded on the optical recording medium are detected based on an output of the photodetector.

22 Claims, 16 Drawing Sheets

OPTICAL PICKUP APPARATUS FOR DETECTION OF FOCUSING ERROR, TRACKING ERROR, AND INFORMATION

BACKGROUND OF THE INVENTION

1. Field of the Invention

This invention relates to an optical pickup apparatus for detecting (reading out) signals recorded on an optical recording medium such as an optical disk. This invention particularly relates to an optical pickup apparatus using a light guide provided with a focusing grating. This invention also relates to a pickup apparatus for detecting signals recorded on a magneto-optical recording medium such as a magneto-optical disk, particularly a pickup apparatus for a magneto-optical recording medium, which is made small and light by use of a light guide.

2. Description of the Prior Art

In recent years, optical recording media such as optical disks are widely used as recording media for image signals, audio signals or the like. Signals recorded on the optical recording medium in the form of pits, differences in reflectivity, or the like are detected by use of an optical pickup apparatus. (The case where signals are recorded using bits is hereinafter taken as an example.) The optical pickup apparatus is constituted to expose the surface of the optical recording medium to light such as a laser beam, and to detect the level of the light reflected by the optical recording medium, thereby to detect the presence or absence of a pit on the surface of the optical recording medium.

Besides the function of carrying out detection of the recorded signals as mentioned above, the optical pickup apparatus is required to have the function of detecting tracking error, i.e. the function of detecting whether the light beam for pit detection is deviated rightward or leftward from the center of a predetermined pit string (track), and the function of detecting focusing error, i.e. the function of detecting whether the focusing point of the light beam is deviated forward or backward from the reflection surface of the optical recording medium. A signal representing the tracking error or the focusing error is utilized to control tracking or focusing so that the signal is canceled, thereby to irradiate the light beam accurately to the predetermined track or to focus the light beam accurately onto the reflection surface of the optical recording medium. As the method of detecting the tracking error, there have heretofore been known the push-pull technique, the heterodyning technique, temporal (time difference) detection technique and other such techniques. On the other hand, as the method of detecting the focusing error, there have heretofore been known the astigmatism technique, the critical angle detection technique, the Foucault technique and other such techniques.

In order to provide the aforesaid functions, the conventional optical pickup apparatus is composed of small optical elements such as a beam splitter for splitting a light beam reflected by an optical recording medium from the light beam irradiated onto the optical recording medium, a lens for converging the reflected light beam in the vicinity of a photodetector such as a photodiode, and a prism and a cylindrical lens for carrying out the tracking error detecting method and the focusing error detecting method.

However, the aforesaid small optical elements require accurate machining or processing, and troublesome adjustment of positions of the small optical elements with respect to each another must be carried out at the time of assembling the optical pickup apparatus. Therefore, the optical pickup apparatus using such optical elements naturally becomes expensive. Also, the optical pickup apparatus having the configuration as mentioned above is large and heavy, and therefore is disadvantageous from the viewpoint of making the read-out apparatus small and light and shortening the access time.

Accordingly, various attempts have heretofore been made to eliminate the aforesaid drawbacks of the conventional optical pickup apparatus by simplifying the configuration of the optical pickup apparatus by use of, for example, a special optical element such as an aspherical lens. However, the optical element of this type is very expensive, and therefore the cost of the optical pickup apparatus using such an optical element does not become much lower than the cost of the aforesaid optical pickup apparatus even though the configuration is simplified.

On the other hand, in recent years, magneto-optical recording media such as magneto-optical disks are also widely used as recording media for image signals, audio signals or the like. Signals recorded on the magneto-optical recording medium in terms of directions of magnetization are detected by use of an optical pickup apparatus. The optical pickup apparatus is constituted to irradiate, for example, linearly polarized light such as a laser beam to the surface of the magneto-optical recording medium, and to detect the directions of magnetization on the magneto-optical recording medium by utilization of the magnetic Kerr effects with which the plane of polarization of the light reflected by the magneto-optical recording medium is rotated in accordance with the direction of magnetization.

Specifically, with the pickup apparatus for the magneto-optical recording medium, the light reflected by the magneto-optical recording medium is detected by a photodetector via an analyzer, and the directions of magnetization, i.e. the recorded signals, are deflected by utilizing such effects that the detected optical amounts change in accordance with the rotation of the plane of polarization of the reflected light. As in the case of the aforesaid optical pickup apparatus, the pickup apparatus is required to have the function of carrying out detection of the recorded signals as mentioned above, the function of detecting tracking error, i.e. the function of detecting whether the light beam for the detection of the condition of magnetization is deviated rightward or leftward from the center of a track along a predetermined groove, and the function of detecting focusing error, i.e. the function of detecting whether the focusing point of the light beam is deviated forward or backward from the deflection surface of the magneto-optical recording medium. A signal representing the tracking error or the focusing error is utilized in the same manner as in the case of the aforesaid optical pickup apparatus.

In order to provide the aforesaid functions together with the signal detecting function, the conventional pickup apparatus for a magneto-optical recording medium is composed of small optical elements such as the aforesaid beam splitter, the lens, the analyzer and the prism.

However, the same problems as mentioned above arise in the case where the aforesaid small optical elements are used. Particularly, in the case where differential detection for improvement of the S/N ratio of the read-out signals is carried out, a semi-transparent mirror or the like is necessary for splitting the reflected light beam into two beams, and some optical systems for the differential detection require two analyzers. Therefore, in this case, the pickup apparatus becomes more complicated, larger and heavier.

SUMMARY OF THE INVENTION

The primary object of the present invention is to provide an optical pickup apparatus which is small, light and cheap.

Another object of the present invention is to provide a pickup apparatus for a magneto-optical recording medium which is small, light and cheap.

An optical pickup apparatus in accordance with the present invention is constituted so that the effects of the optical elements such as the beam splitter, the lens and the prism are achieved by a focusing grating provided on a light guide.

Specifically, the present invention provides an optical pickup apparatus comprising:

(i) a light source for irradiating a light beam onto a surface of an optical recording medium, (ii) an objective lens for converging said light beam onto the reflection surface of said optical recording medium, (iii) a light guide disposed in such a direction that one surface thereof receives the light beam reflected by said optical recording medium, (iv) a focusing grating provided at an incidence position of said reflected light beam on one surface of said light guide for making said reflected light beam enter said light guide in such a direction that said reflected light beam advances toward an edge face of said light guide by repetition of total reflection between said one surface of said light guide and the other surface of said light guide facing said one surface, and converging the light beam thus guided and advancing inside of said light guide, (v) a photodetector secured to the surface or the edge face of said light guide for detecting said guided light beam converging by said focusing grating, (vi) an error detection circuit for carrying out detection of tracking error and detection of focusing error on the basis of an output of said photodetector, and (vii) a signal detection circuit for detecting signals recorded on said optical recording medium on the basis of the output of said photodetector.

The focusing grating is a deflection grating having a curvature and "chirp", or a curvature. The focusing grating diffracts the incident light and converges the diffracted light.

In the optical pickup apparatus in accordance with the present invention, the light beam reflected by the optical recording medium is separated by the diffracting effect of the focusing grating from the optical path of the light beam advancing from the light source toward the optical recording medium. This effect is the same as the effect of the beam splitter in the conventional optical pickup apparatus. Also, the focusing grating converges the reflected light beam. The converging effect of the focusing grating is the same as the effect of the lens in the conventional optical pickup apparatus.

Also, two focusing gratings may be provided to split the light beam reflected by the optical recording medium into two beams in the tracking direction for the purposes of detection of tracking error and deflection of focusing error. Alternatively, an astigmatism grating may be utilized as the focusing grating, thereby to give rise to astigmatism in the reflected light beam for the purposes of detection of tracking error and detection of focusing error. This effect is the same as the effect of the prism or the cylindrical lens in conventional optical pickup apparatus.

As mentioned above, with the optical pickup apparatus in accordance with the present invention, the effects of the optical elements such as the beam splitter, the lens and the prism in the conventional optical pickup apparatus are achieved by the focusing grating provided on the light guide. Therefore, the optical pickup apparatus in accordance with the present invention can be fabricated small and light with a very small number of parts. Accordingly, the cost of the apparatus becomes markedly lower and the access time can be shortened as compared with the conventional optical pickup apparatus.

On the other hand, a first pickup apparatus for a magneto-optical recording medium in accordance with the present invention is constituted so that the effects of the optical elements such as the beam splitter, the lens, the prism, the analyzer, and a semi-transparent mirror for carrying out differential detection in the conventional pickup apparatus are achieved by a light guide provided with focusing gratings and a light-permeable member composed of a uniaxial anisotropic crystal.

Specifically, the present invention also provides a first pickup apparatus for a magneto-optical recording medium, which comprises:

(i) a light source for irradiating a linearly polarized light beam onto a surface of a magneto-optical recording medium, (ii) an objective lens for converging said light beam onto the reflection surface of said magneto-optical recording medium, (iii) a light guide disposed in such a direction that one surface thereof receives the light beam reflected by said magneto-optical recording medium, (iv) a first focusing grating and a second focusing grating disposed side by side at an incidence position of said reflected light beam on one surface of said light guide so that an axis passing through approximately the center of said reflected light beam and extending on said one surface of said light guide approximately normal to a tracking direction intervenes between said first focusing grating and said second focusing grating, said first focusing grating and said second focusing grating respectively making said reflected light beam enter said light guide in such a direction that said reflected light beam advances toward an edge face of said light guide by repetition of total reflection between said one surface of said light guide and the other surface of said light guide facing said one surface, and respectively converging the light beams, which are thus guided and advance inside of said light guide, to positions spaced from each other with said axis intervening therebetween, (v) a light-permeable member composed of a uniaxial anisotropic crystal and provided in optical paths of said guided light beams advancing by repetition of total reflection inside of said light guide, said light-permeable member having a beam passage surface oblique with respect to directions of advance of said guided light beams, thereby to split a p-polarized light component and a s-polarized light component of each of said guided light beams into optical paths different from each other, (vi) a photodetector secured to the surface or the edge face of said light guide for detecting at least the p-polarized light component or the s-polarized light component of each of said guided light beams converged by said first focusing grating and said second focusing grating, (vii) an error detection circuit for carrying out detection of tracking error and detection of focusing error on the basis of an output of said photodetector, and (viii) a signal detection circuit for detecting signals recorded on said magneto-optical recording medium on the basis of the output of said photodetector.

In the first pickup apparatus for a magneto-optical recording medium in accordance with the present invention, the light beam reflected by the magneto-optical recording medium is introduced by the focusing gratings into the light guide, and is thus separated from the optical path of the light beam advancing from the light source toward the magneto-optical recording medium. This effect is the same as the effect of the beam splitter in the conventional pickup apparatus. Also, the focusing gratings converge the guided light beams in the light guide. The converging effect of the focusing gratings is the same as the effect of the lens in the conventional pickup apparatus. Further, since the first focusing grating and the second focusing grating are disposed at the positions as mentioned above, the light beam reflected by the magneto-optical recording medium and incident upon the focusing gratings is separated into two guided light beams in the tracking direction and converged onto two spots. This effect is the same as the effect of the prism in the conventional pickup apparatus.

Also, each of the guided light beams is separated into the p-polarized light component and the s-polarized light component by the light-permeable member composed of the uniaxial anisotropic crystal. Therefore, in the case where a first photodetector and a second photodetector for detecting the p-polarized light components of the guided light beams converged by the first focusing grating and the second focusing grating respectively, and a third photodetector and a fourth photodetector for detecting the s-polarized light components of the guided light beams converged by the first focusing grating and the second focusing grating respectively are provided by way of example, the outputs of the first photodetector and the third photodetector for detecting the polarized light components different from each other change complementarily in accordance with the direction of polarization of the reflected light beam. The same thing applies to the outputs of the second photodetector and the fourth photodetector. Accordingly, the direction of polarization of the reflected light beam, i.e. the signal recorded on the magneto-optical recording medium, can be detected by detecting the difference between the sum of the outputs of the first and second photodetectors on one hand and the sum of the outputs of the third and fourth photodetectors on the other hand by use of a differential detection circuit. In this manner, read-out signals of a high S/N ratio can be obtained as in the case where differential detection is carried out by use of a differential detection optical system. Specifically, as the light-permeable member is provided, the beam splitting effect can be obtained in the same manner as the semi-transparent mirror or the like, and the same effect as the aforesaid analyzer can be obtained.

Also, a second pickup apparatus for a magneto-optical recording medium in accordance with the present invention is constituted so that the effects of the optical elements such as the beam splitter, the lens, the prism and the analyzer are achieved by a light guide provided with focusing gratings.

Specifically, the present invention further provides a second pickup apparatus for a magneto-optical recording medium, which comprises:

(i) a light source for irradiating a linearly polarized light beam onto a surface of a magneto-optical recording medium, (ii) an objective lens for converging said light beam onto the reflection surface of said magneto-optical recording medium, (iii) a light guide disposed in such a direction that one surface thereof receives the light beam reflected by said magneto-optical recording medium, (iv) a first focusing grating and a second focusing grating disposed side by side at an incidence position of said reflected light beam on one surface of said light guide so that an axis passing through approximately the center of said reflected light beam and extending on said one surface of said light guide approximately normal to a tracking direction intervenes between said first focusing grating and said second focusing grating, said first focusing grating and said second focusing grating respectively making said reflected light beam enter said light guide in such a direction that said reflected light beam advances toward an edge face of said light guide by repetition of total reflection between said one surface of said light guide and the other surface of said light guide facing said one surface, and respectively converging the light beams, which are thus guided and advance inside of said light guide, to positions spaced from each other with axis intervening therebetween, (v) a light guide edge face formed in such a direction that said guided light beams advancing by repetition of total reflection inside of said light guide are incident at the Brewster angle upon said light guide edge face, (vi) a plurality of photodetectors for detecting at least the two guided light beams passing through said light guide edge face, or the two guided light beams reflected by said light guide edge face, (vii) an error detection circuit for carrying out detection of tracking error and detection of focusing error on the basis of outputs of said photodetectors, and (viii) a signal detection circuit for detecting signals recorded on said magneto-optical recording medium on the basis of the outputs of said photodetectors.

In the second pickup apparatus for a magneto-optical recording medium in accordance with the present invention, the same effects as the effects of the optical elements such as the beam splitter, the lens and the prism can be obtained with the light guide.

Also, the Brewster angle ($\alpha B$) is expressed as $$\alpha B = \tan^{-1}(n2/n1)$$

wherein n1 denotes the refractive index of the light guide, and n2 denotes the refractive index of a medium adjoining the light guide by being bounded by the aforesaid light guide edge face formed in such a direction that the guided light beams advancing inside of the light guide are incident at the Brewster angle upon the light guide edge face. When each of the linearly polarized and guided light beams impinges at the Brewster angle upon the light guide edge face, only a part of the s-polarized light component of the guided light beam is reflected by the light guide edge face at a predetermined reflectivity, and the other part of the s-polarized light component and the p-polarized light component pass through the light guide edge face. Therefore, in the case where the guided light beam reflected by the light guide edge face by way of example, the ratio of the s-polarized light component (i.e. the direction of polarization) in the guided light beam prior to the separation at the light guide edge face, and consequently the signals recorded on the magneto-optical recording medium, can be detected. Accordingly, as the light guide edge face is provided, the beam splitting effect can be obtained in the same manner as the semi-transparent mirror or the like, and the same effect as the aforesaid analyzer can be obtained.

As mentioned above, with the first and second pickup apparatuses for a magneto-optical recording medium, the effects of the optical elements such as the beam splitter, the lens, the prism, the semi-transparent mirror and the analyzer in the conventional pickup apparatus can be obtained by the focusing gratings provided on the light guide, and the light-permeable member composed of the uniaxial anisotropic crystal or the light guide edge face formed in such a direction that the guided light beams advancing inside of the light guide are incident at the Brewster angle upon the light guide edge face. Therefore, the pickup apparatuses for a magneto-optical recording medium in accordance with the present invention can be fabricated small and light with a very small number of parts. Accordingly, the cost of the apparatus becomes markedly lower and the access time can be shortened as compared with the conventional pickup apparatus.

Also, the major part of the optical pickup apparatus and the pickup apparatuses for a magneto-optical recording medium in accordance with the present invention can be readily mass-produced by a planar technique. This feature also contributes to reduction in the cost of the apparatus.

The optical pickup apparatus and the pickup apparatuses for a magneto-optical recording medium in accordance with the present invention are free from adjustment of positions of the optical elements as in the conventional pickup apparatus. Also, with the optical pickup apparatus and the pickup apparatuses for a magneto-optical recording medium in accordance with the present invention wherein the photodetector is coupled with the light guide, it is not necessary to carry out adjustment of the positions of the photodetector with respect to the aforesaid optical elements. These features also contribute to reduction in the cost of the apparatus.

DESCRIPTION OF THE PREFERRED EMBODIMENTS

The present invention will hereinbelow be described in further detail with reference to the accompanying drawings.

Figure 1:
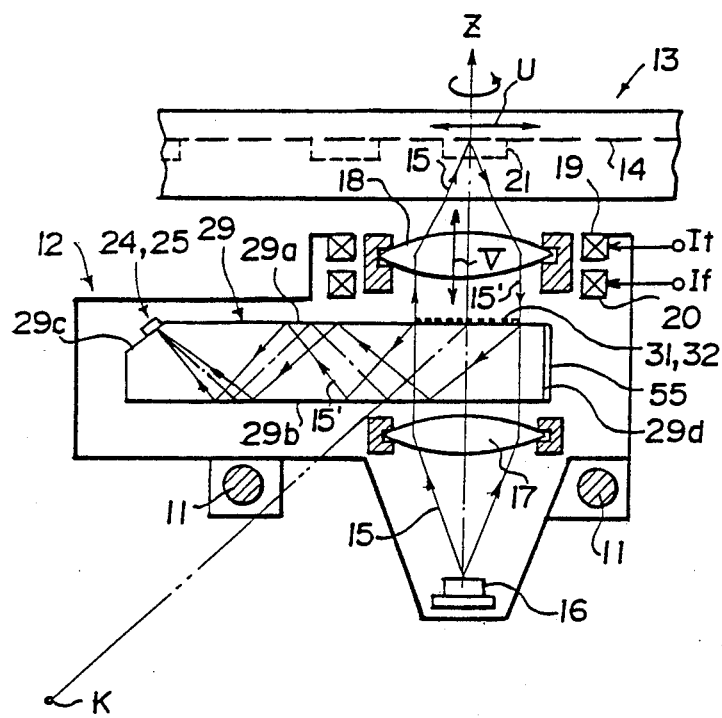
FIG. 1 is a side view showing an embodiment of the optical pickup apparatus in accordance with the present invention.
Figure 2:
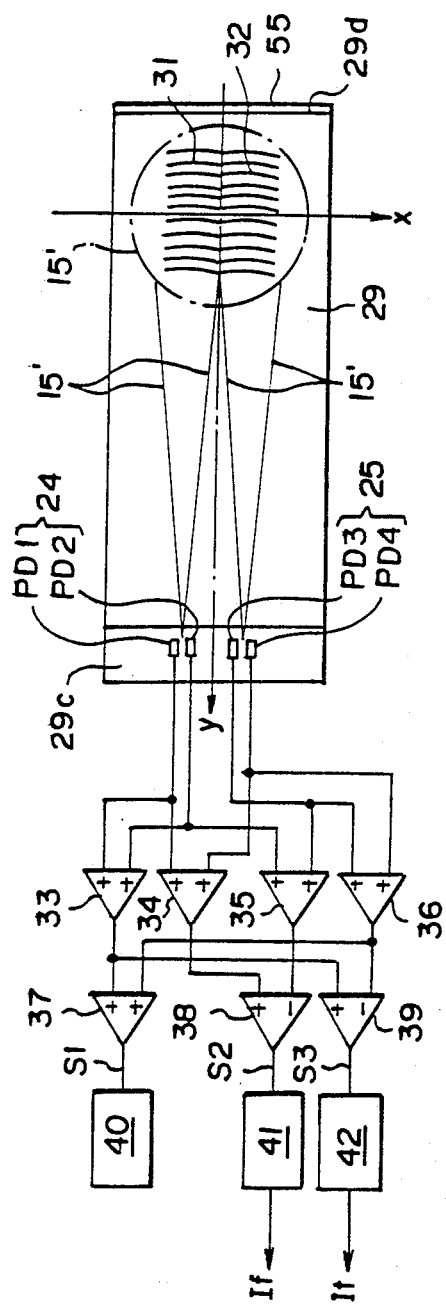
FIG. 2 is a schematic view showing the top plan shape of the light guide in the embodiment shown in FIG. 1 and the electric circuit used for the embodiment.

FIG. 1 shows an embodiment of the optical pickup apparatus in accordance with the present invention, and FIG. 2 shows the top plan view of a light guide of the embodiment shown in FIG. 1 and an electric circuit used for the embodiment shown in FIG. 1. As shown in FIG. 1, the optical pickup apparatus is provided with rods 11, 11 extending at an angle approximately normal to the drawing sheet in FIG. 1, and a block 12 movable along the rods 11, 11. In order to follow along a pit string (track), the block 12 is moved normal to or approximately normal to the array direction of pits 21 on an optical disk 13 (i.e. the direction as indicated by the arrow U at the light beam incidence position) by, for example, a precision feed screw and an optical system feed motor.

The block 12 is provided with a semiconductor laser 16 for emitting a light beam (a laser beam) 15 to a reflection surface 14 of the optical disk 13, a collimator lens 17 for collimating the divergent light beam 15 emitted by the semiconductor laser 16, and an objective lens 18 for converging the collimated light beam 15 onto the reflection surface 14 of the optical disk 13. For the purposes of tracking control and focusing control as will be described later, the objective lens 18 is supported moveably in a tracking direction normal to the direction as indicated by the arrow U and in a focusing direction as indicated by the arrow V, and is moved in these directions by a tracking coil 19 and a focusing coil 20.

A flat plate-shaped light guide 29 composed of an optical glass or the like is disposed between the collimator lens 17 and the objective lens 18 in such a direction that a surface 29a of the light guide 29 receives a light beam 15' reflected by the optical disk 13. Also, as shown in FIG. 2, a first focusing grating 31 and a second focusing grating 32 are disposed adjacent to each other on the surface 29a of the light guide 29 at the position upon which the reflected light beam 15' impinges. (The focusing grating will hereinafter be abbreviated to FG.) Each of the FG 31 and the FG 32 is diffraction grating having a curvature or a curvature and "chirp". The FG 31 and the FG 32 respectively diffract and introduce the reflected light beam 15' into the light guide 29, make the reflected light beam 15' advance inside of the light guide 29 toward an edge face of the light guide 29 by repetition of total reflection between the surface 29a and a surface 29b of the light guide 29 opposite to the surface 29a, and converge the reflected light beam 15' (guided light beams 15', 15') thus guided through the light guide 29 into a single spot in the light guide 29. As shown in FIG. 2, the FG 31 and the FG 32 are disposed side by side so that a y axis on the light guide 29 normal to the aforesaid tracking direction and passing through nearly the center of the reflected light beam 15' intervenes between the FG 31 and the FG 32. Also, the FG 31 and the FG 32 are formed to coverge the guided light beams 15', 15' to positions spaced from each other with the y axis intervening therebetween. The FG 31 and the FG 32 may be provided on the surface 29b opposite to the surface 29a of the light guide 29.

When the space coordinates are defined by the y axis, the x axis, i.e. the axis in the tracking direction, shown in FIG. 2 and a z axis passing through the intersecting point of the x axis with the y axis and normal to the x and y axes, and coordinates of the positions of beam convergence by the FG 31 and the FG 32 (i.e. the positions of convergence as indicated by a point K in FIG. 1 in the case where total reflection is not effected in the light guide 29) are respectively expressed as ($-Fx$, $Fy$, $Fz$) and ($Fx$, $Fy$, $Fz$), an m'th grating pattern of each of the FG 31 and the FG 32 having the aforesaid effects is expressed as $$n_1 \sqrt{(x \mp Fx)^2 + (y - Fy)^2 + Fz^2} = m\lambda + \text{const.} \quad (1)$$
($x \gtrless 0$, double signs in same order)

where n1 denotes the refractive index of the light guide 29, and $\lambda$ denotes the optical wavelength of the reflected light beam 15'.

The FG 31 and the FG 32 may be formed by, for example, forming a Si-N film on the light guide 29 by PCVD (plasma-enhanced chemical vapor deposition), forming a resist pattern by the electron beam direct drawing method, and then transferring the pattern to the Si-N film by RIE.

Also, the light guide 29 is provided with an edge face 29c obliquely cut to extend along the positions of convergence of the separated and guided light beams 15', 15'. A first-set photodetector 24 and a second-set photodetector 25 are disposed on the edge face 29c of the light guide 29 for respectively detecting the guided light beams 15', 15' converged by the first FG 31 and the second FG 32. The first-set photodetector 24 is composed of photodiodes PD1 and PD2 divided from each other by a gap extending in parallel with a plane on which the y axis lies and which is normal to the surface 29a of the light guide 29, and the second-set photodetector 28 is composed of photodiodes PD3 and PD4 divided from each other in the same manner as the photodiodes PD1 and PD2.

Figure 3:
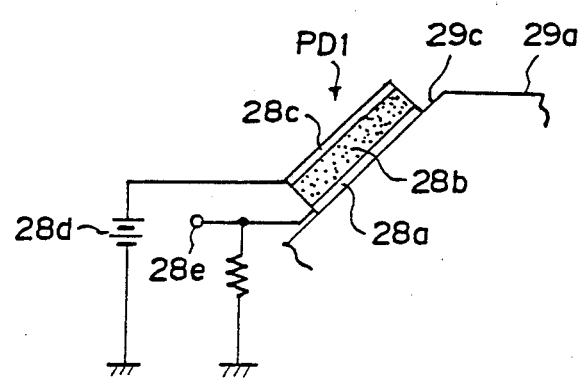
FIG. 3 is a side view showing the photodetector in the embodiment shown in FIG. 1, FIGS. 4, 5, 6 and 7 are side views showing further embodiments of the optical pickup apparatus in accordance with the present invention.

As shown in detail in FIG. 3 by way of example, the photodiodes PD1 is formed by, for example, stacking a lower transparent electrode 28a, a thin film-like photoconductive material 28b, and an upper electrode 28c in this order on the light guide 29. Also, an electric power source 28d is connected to apply a predetermined electric field between the lower transparent electrode 28a and the upper electrode 28c. With the photodiode PD1 having the configuration as mentioned above, when the photoconductive material 28b is exposed to light, a photocurrent of a level proportional to the amount of light flows through the photoconductive material 28b. Therefore, the amount of light which the photoconductive material 28b receives can be detected by detecting a change in potential at a terminal 28e. The photodiodes PD2, PD3 and PD4 are constituted in the same manner as the photodiode PD1. The thin film-like photoconductive material 28b may be constituted by, for example, an epitaxial film, a polycrystalline film or an amorphous film formed of Si or Ge as an element of Group IV of the periodic table, Se as an element of Group VI, GaAs of Groups III and V, ZnO 1 or CdS of groups II and VI, or PbS of Groups IV and VI. The thin film-like photoconductive material 26b may also be constituted by a film forming a photodiode by generating the p-n junction or the p-i-n junction by the addition of atoms (B, P or the like) of the Group III or Group V to an amorphous calcogen film (a-Se, a-Se-As-Te or the like) or a film containing amorphous Si as the main constituent and also containing hydrogen and/or fluorine (a-Si:H, a-SiGe:H, a-SiC:H or the like), or by a film forming a photodiode by use of the film containing amorphous Si as the main constituent and also containing hydrogen and/or fluorine and an electrode constituting the Schottky junction.

As shown in FIG. 2, the outputs of the photodiodes PD1 and PD2 are added together by an addition amplifier 33, and the outputs of the photodiodes PDS and PD4 are added together by an addition amplifier 36. Also, the output of the outer photodiode PD1 of the first-set photodetector 24 and the output of the outer photodiode PD4 of the second-set photodetector 25 are added together by an addition amplifier 34, and the outputs of the inner photodiodes PD2 and PD3 are added together by an addition amplifier 35. The outputs of the addition amplifiers 33 and 36 are fed to an addition amplifier 37 and a differential amplifier 39, and the outputs of the addition amplifiers 34 and 35 are fed to a differential amplifier 38. An output S1 of the addition amplifier 37, an output S2 of the differential amplifier 38, and an output S3 of the differential amplifier 39 are respectively fed to a read-out circuit 40, a focusing coil drive control circuit 41 and a tracking coil drive control circuit 42.

Operations of the optical pickup apparatus having the configuration as mentioned above will be described hereinbelow. The light beam (laser beam) 15 emitted by the semiconductor laser 16 and collimated by the collimator lens 17 passes through the light guide 29 and is converged by the objective lens 18 so that the light beam 15 is focused on the reflection surface 14 of the optical disk 13. The optical disk 13 is rotated by a rotation drive means (not shown) so that the string (track) of pits 21 is moved in the direction as indicated by the arrow U at the incidence position of the light beam 15. As is well known, the pits 21 carry image signals, audio signals or the like. The level of the light beam 15' reflected by the optical disk 13 becomes high at a portion free of the pits 21, and becomes low at a portion where the pits 21 are present. The reflected light beam 15' passes through the objective lens 18, and is diffracted by and introduced into the light guide 29 by the FG 31 and the FG 32. The light beams 15', 15' thus introduced into and guided inside of the light guide 29 advance by repeating total reflection between the surface 29a and the surface 29b of the light guide 29, and are converged into two sports with the y axis intervening therebetween by the beam converging effects of the FG 31 and the FG 32.

The light amount of the guided light beam 15' converged by the FG 31 is detected by the photodiodes PD1 and PD2, and the light amount of the guided light beam 15' converged by the FG 32 is detected by the photodiodes PD3 and PD4. Therefore, the output S1 of the addition amplifier 37 which adds the outputs of the addition amplifiers 33 and 36 together represents the overall light amount of the light beam 15' reflected by the optical disk 13, i.e. the presence or absence of the pits 21 on the optical disk 13. The output S1 is subjected to read-out processing in the read-out circuit 40, and the information recorded on the optical disk 13 is read out in this manner.

The block 12 is moved normal to or approximately normal to the direction as indicated by the arrow U by the optical system feed motor as mentioned above, whereby the incidence position (the position in the radial direction of the optical disk 13) of the light beam 15 upon the optical disk 13 is changed and the pits 21 are read out sequentially. The light beam 15 must be made to impinge accurately upon the center of the predetermined pit string (track). The tracking control for accurately maintaining the incidence position of the light beam 15 upon the optical disk 13 will be described below. When the center of the reflected light beam 15' is positioned exactly between the FG 31 and the FG 32, the light amount detected by the first-set photodetector 24 (i.e. the photodiodes PD1 and PD2) and the light amount detected by the second-set photodetector 25 (i.e. the photodiodes PD3 and PD4) coincide with each other. Therefore, in this case, the output S3 of the differential amplifier 39 becomes 0 (zero). On the other hand, when the incidence position of the light beam 15 upon the optical disk 13 becomes incorrect and the optical intensity distribution of the reflected light beam 15' is deviated upwardly in FIG. 2, the light amount detected by the first-set photodetector 24 becomes larger than the light amount detected by the second-set photodetector 25. Therefore, in this case, the output S3 of the differential amplifier 39 becomes "+" (plus). Conversely, when the optical intensity distribution of the reflected light beam 15' is deviated downwardly in FIG. 2, the output S3 of the differential amplifier 39 becomes "−" (minus). That is, the output S3 of the differential amplifier 39 represents the direction of the tracking error (the direction as indicated by the arrow x in FIG. 2). The output S3 is fed as a tracking error signal to the tracking coil drive control circuit 42. The technique of detecting the tracking error by processing the outputs of the photodiodes PD1 to PD4 in the manner as mentioned above has heretofore been established as the push-pull technique. Upon receiving the tracking error signal S3, the tracking coil drive control circuit 42 feeds an electric current It in accordance with the direction of the tracking error represented by the signal S3 to the tracking coil 19 for moving the objective lens 18 in a direction that cancels the tracking error. In this manner, the light beam 15 is made to impinge accurately upon the center of the pit string.

The focusing control for converging the light beam 15 accurately onto the reflection surface 14 of the optical disk 13 will be described hereinbelow. When the light beam 15 is focused accurately on the reflection surface 14 of the optical disk 13, the guided light beam 15' converged by the FG 31 is converged at the middle position between the photodiodes PD1 and PD2. At this time, the guided light beam 15' converged by the FG 32 is converged at the middle position between the photodiodes PD3 and PD4. Therefore, the output of the addition amplifier 34 and the output of the addition amplifier 35 become equal to each other, and the output S2 of the differential amplifier 38 becomes 0 (zero). On the other hand, in the case where the light beam 15 is converged at a position forward from the reflection surface 14, the reflected light beam 15' impinges in the converged form upon the FG 31 and the FG 32, and the incidence positions of the guided light beam 15', 15' upon the first-set photodetector 24 and the second-set photodetector 25 are deviated inwardly, i.e. toward the photodiode PD2 and toward the photodiode PD3. Therefore, in this case, the output of the addition amplifier 34 becomes lower than the output of the addition amplifier 35, and the output S2 of the differential amplifier 38 becomes "−" (minus). Conversely, in the case where the light beam 15 is converged at a position backward from the reflection surface 14, the reflected light beam 15' impinges in the divergent form upon the FG 31 and the FG 32, and the incidence positions of the guided light beam 15', 15' upon the first-set photodetector 24 and the second-set photodetector 25 are deviated outwardly, i.e. toward the photodiode PD1 and toward the photodiode PD4. Therefore, in this case, the output of the addition amplifier 34 becomes higher than the output of the addition amplifier 35, and the output S2 of the differential amplifier 38 becomes "+" (plus). Thus the output S2 of the differential amplifier 38 represents the direction of the focusing error. The output S2 is fed as a focusing error signal to the focusing coil drive control circuit 41. The technique of detecting the focusing error by processing the outputs of the photodiodes PD1 to PD4 in the manner as mentioned above has heretofore been carried out in the Foucault technique using a Foucault prism. Upon receiving the focusing error signal S2, the focusing coil drive control circuit 41 feeds an electric current If in accordance with the direction of the focusing error represented by the signal S2 to the focusing coil 20 for moving the objective lens 18 in a direction that cancels the focusing error. In this manner, the light beam 15 is made to converge accurately onto the reflection surface 14 of the optical disk 13.

In the course of advance of the light beam 15 emitted by the semiconductor laser 16 from the collimator lens 17 toward the objective lens 18, a part of the light beam 15 is taken by the FG 31 and the FG 32 into the light guide 29. Therefore, in order to prevent the light beam 15 from being reflected by an edge face 29d of the light guide 29 and detected by the first-set photodetector 24 and the second-set photodetector 25, a light absorbing member 55 should preferably be secured to the edge face 29d, or the edge face 29d should preferably be processed into a rough surface.

In the aforesaid embodiment, the FG 31 and the FG 32 are formed so that their gratings closely contact each other. However, the FG 31 and the FG 32 may be formed independently of each other in slightly spaced relation. This also applies to the embodiments described below.

Also, the FG 31 and the FG 32 may be formed so that the guided light beam 15', 15' converged by the FG 31 and the FG 32 intersect each other, i.e. so that the position of beam convergence by the FG 31 is on the lower side of the y axis in FIG. 2 and the position of beam convergence by the FG 32 is on the upper side of the y axis.

Further embodiments of the optical pickup apparatus in accordance with the present invention will hereinbelow be described with reference to FIGS. 4 to 8. In FIGS. 4 to 8, similar elements are numbered with the same reference numerals with respect to FIG. 1 (this applies also to the other drawings).

Figure 4:
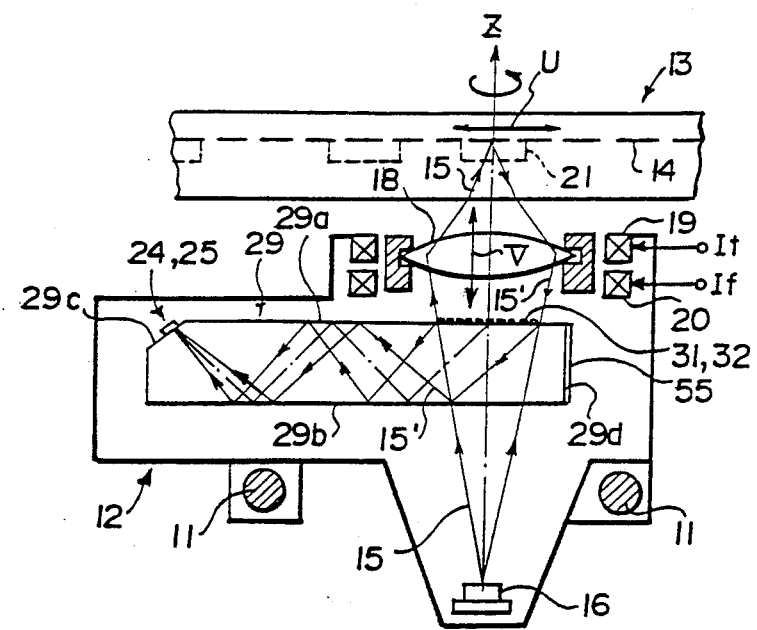

In an embodiment shown in FIG. 4, the collimator lens 17 in the embodiment shown in FIG. 1 is omitted, and the light beam 15' reflected by the optical disk 13 is taken in the converged form into the light guide 29. Also with this configuration, tracking error and focusing error can be detected by detecting the guided light beams 15', 15' converged by the converging effects of the FG 31 and the FG 32 by use of the first-set photodetector 24 and the second-set photodetector 25 of the type as shown in FIG. 2.

In this case, when the space coordinates and the coordinates of the positions of beam convergence by the FG 31 and the FG 32 are defined in the same manner as in the embodiment shown in FIG. 1 and the coordinates of the light source are defined as (0, 0, Lz), an m'th grating pattern of each of the FG 31 and the FG 32 is expressed as $$\sqrt{x^2 + y^2 + Lz^2} + n_1 \sqrt{(x \mp Fx)^2 + (y - Fy)^2 + Fz^2} = m\lambda + \text{const.} \quad (2)$$

(x 0, double signs in same order)

wherein n1 denotes the refractive index of the light guide 29.

Figure 5:
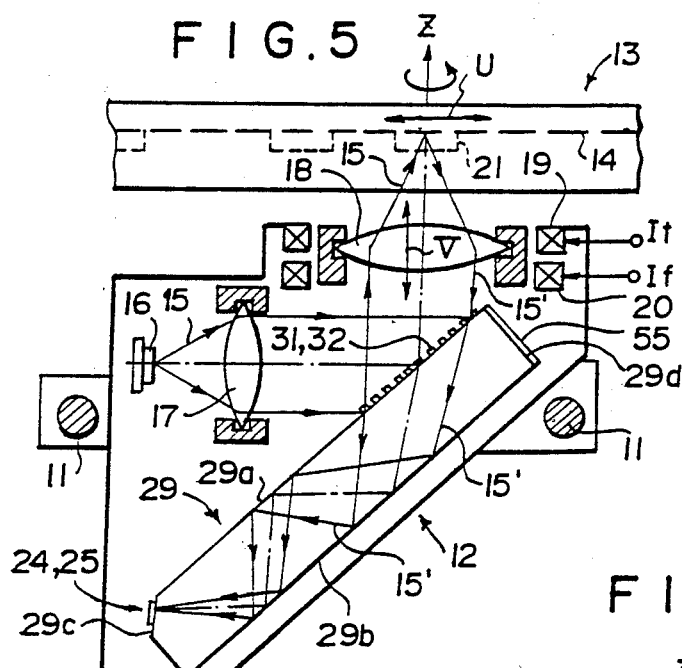

In a further embodiment shown in FIG. 5, the light guide 29 is formed of a material exhibiting a substantially large refractive index, and the light beam 15 is reflected by the surface of the light guide 29 toward the optical disk 13. Also in this case, the light beam 15' reflected by the optical disk 13 is diffracted and converged by the FG 31 and the FG 32.

Figure 6:
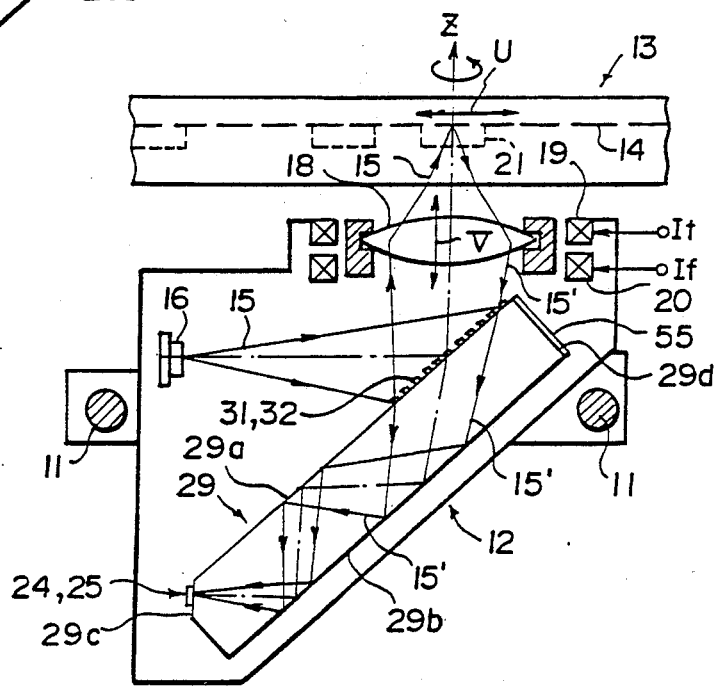

In a still further embodiment shown in FIG. 6, the light beam 15 emitted by the semiconductor laser 16 in the divergent form is reflected in this form by the surface of the light guide 29 toward the optical disk 13.

Figure 7:
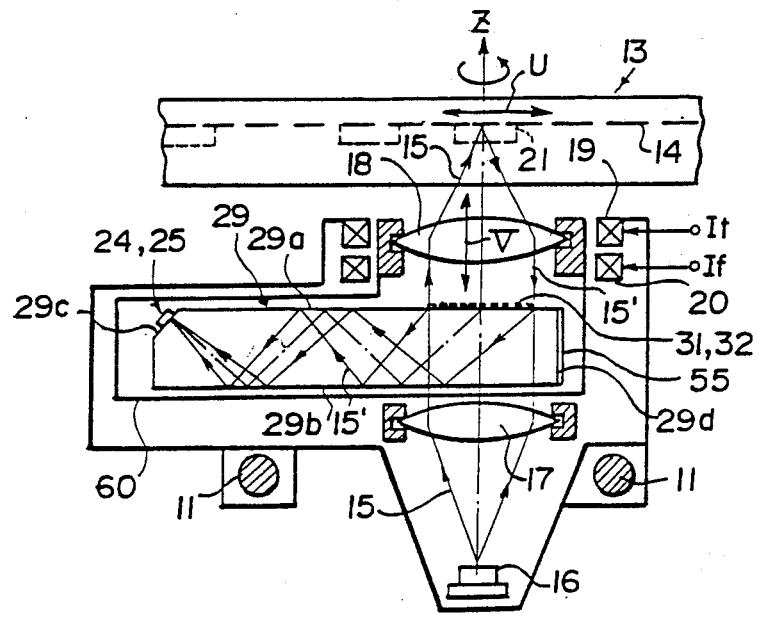

In another embodiment shown in FIG. 7, the light guide 29 and the objective lens 18 are secured to a single head 60, and the head 60 is supported moveably in the tracking direction and in the focusing direction with respect to the block 12. The head 60 is moved by the tracking coil 19 and the focusing coil 20. Specifically, in this embodiment, the light guide 29 is moved together with the objective lens 18 for the purposes of tracking control and focusing control. With this configuration, the problem that the objective lens 18 is deviated from the light guide 29 in the course of tracking control as in the case where the objective lens 18 alone is moved can be eliminated, and tracking control can be carried out more accurately.

In the embodiments shown in FIGS. 1 to 7, the reflected light beam 15' is split into two light beams 15', 15', tracking error is detected by the push-pull technique, and focusing error is detected by the Foucault technique. However, detection of the tracking error and the focusing error may be carried by use of any other technique. For example, in another embodiment shown in FIG. 8, a single FG 71 is provided on the light guide 29, and the FG 71 is constituted by an astigmatism grating. Therefore, the reflected light beam 15' passing through the FG 71 has astigmatism, and the tracking error and the focusing error can be detected respectively by use of the known heterodyning technique and the astigmatism technique by detecting the reflected light beam 15' by a photodetector 72 composed of four photodiodes divided from each other.

Figure 8:
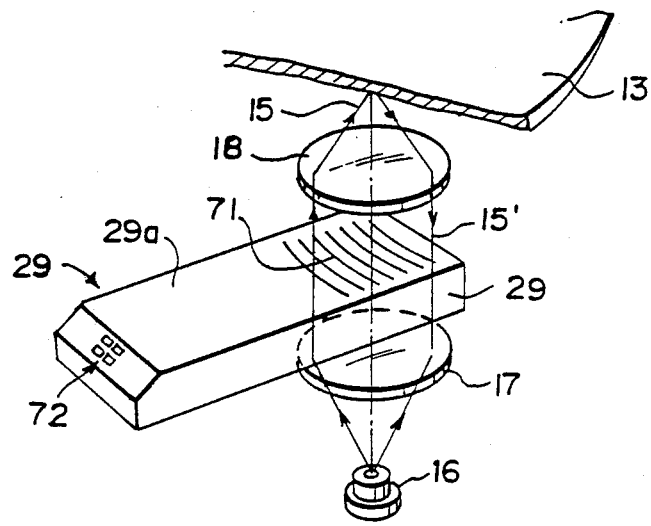
FIG. 8 is a schematic perspective view showing a still further embodiment of the optical pickup apparatus in accordance with the present invention.

Also in the case where the tracking error and the focusing error are detected in the manner as mentioned with respect to FIG. 8, the apparatus may be constituted so that the light beam 15 passes in the divergent form through the light guide 29, or so that the light beam 15 is reflected by the surface of the light guide 29 toward the optical disk 13. Further, tracking control and focusing control may be carried out by moving the objective lens 18 alone or together with the light guide 29.

Besides the aforesaid method of making the FG 31, the FG 32 and the FG 71, they can be formed by the planar technique by use of a known photolithographic method, a known holographic transfer method or the like, and can be easily mass-produced through duplication.

Embodiments of the first pickup apparatus for a magneto-optical recording medium in accordance with the present invention will be described hereinbelow with reference to FIGS. 9 to 15.

Figure 9:
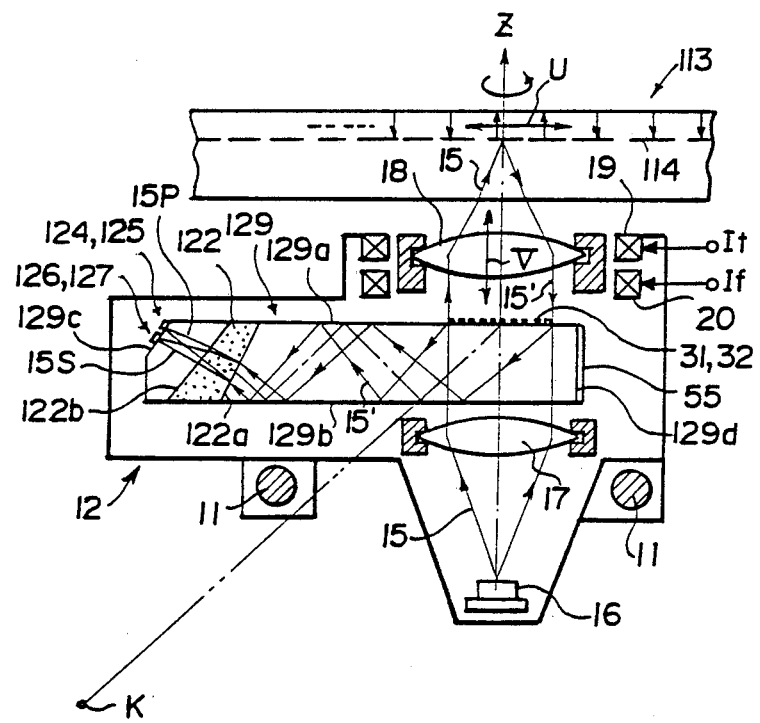
FIG. 9 is a side view showing an embodiment of the first pickup apparatus for a magneto-optical recording medium in accordance with the present invention.
Figure 10:
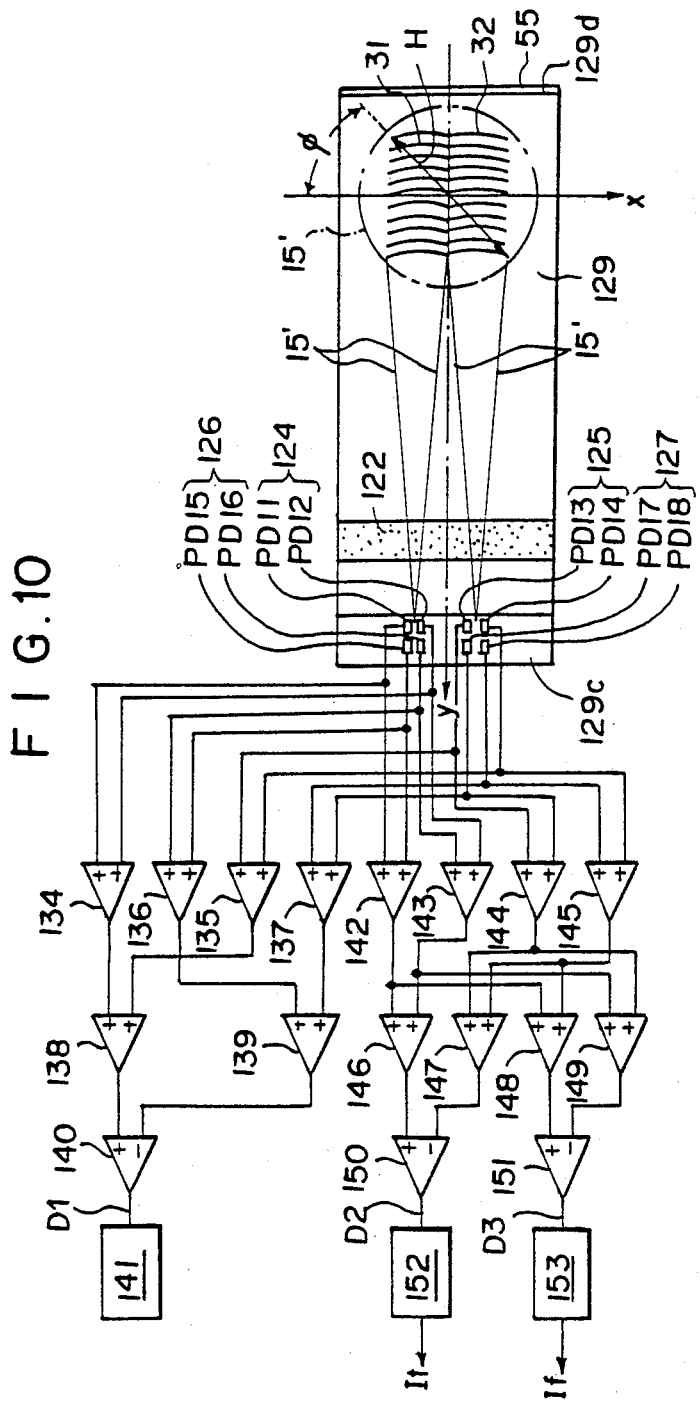
FIG. 10 is a schematic view showing the top plan shape of the light guide in the embodiment shown in FIG. 9 and the electric circuit used for the embodiment.

FIG. 9 shows an embodiment of the first pickup apparatus for a magneto-optical recording medium in accordance with the present invention, and FIG. 10 shows the top plan view of an optical waveguide in the embodiment shown in FIG. 9 and an electric circuit used for the embodiment shown in FIG. 9. In order to follow along a signal string (track) along a predetermined groove, the block 12 shown in FIG. 9 is moved normal to or approximately normal to the direction of the track (i.e. the direction as indicated by the arrow U at the light beam incidence position).

The block 12 is provided with the semiconductor laser 16 for irradiating a linearly polarized light beam (a laser beam) 15 to a reflection surface 114 of a magneto-optical disk 113, the collimator lens 17 for collimating the divergent light beam 15 emitted by the semiconductor laser 16, and the objective lens 18 for converging the collimated light beam 15 onto the reflection surface 114 of the optical disk 113.

A flat plate-shaped light guide 129 composed of an optical glass or the like is disposed between the collimator lens 17 and the objective lens 18 in such a direction that a surface 129a of the light guide 129 receives a light beam 15' reflected by the magneto-optical disk 113. Also, the first FG 31 and the second FG 32 provided on the surface 129a of the light guide 129 at the position upon which the reflected light beam 15' impinges respectively diffract and introduce the reflected light beam 15' into the light guide 129, make the reflected light beam 15' advance inside of the light guide 129 toward an edge face of the light guide 129 by reptition of total reflection between the surface 129a and a surface 129b of the light guide 129 opposite to the surface 129a, and converge the reflected light beam 15' (guided light beams 15', 15') thus guided through the light guide 129 into a single spot in the light guide 129. As shown in FIG. 10, the first FG 31 and the second FG 32 are disposed side by side so that a y axis on the light guide 129 normal to the tracking direction and passing through nearly the center of the reflected light beam 15' intervenes between the FG 31 and the FG 32. Also, the FG 31 and the FG 32 are formed to converge the guided light beams 15', 15' to positions spaced from each other with the y axis intervening therebetween.

As shown in FIG. 10, the light guide 129 is disposed in such a direction that an angle $\phi$ between the x axis and the direction of linear polarization of the reflected light beam 15' as indicated by the arrow H is nearly equal to 45°. The direction of linear polarization of the reflected light beam 15' rotates in accordance with the direction of magnetization in the magneto-optical disk 113. Therefore, in this embodiment, the direction of linear polarization of the light beam 15' reflected by an unmagnetized part is taken as a reference, and the light guide 129 is disposed so that the x axis makes an angle of 45° with respect to said reference direction of linear polarization.

The m'th grating pattern of each of the FG 31 and the FG 32 having the aforesaid effects is expressed as Formula (1) when the space coordinates are defined by the y axis, the x axis, i.e. the axis in the tracking direction, shown in FIG. 10 and a z axis passing through the intersecting point of the x axis with the y axis and normal to the x and y axes, and coordinates of the positions of beam convergence by the FG 31 and the FG 32 (i.e. the positions of convergence as indicated by a point K in FIG. 9 in the case where total reflection in the light guide 129 and refraction by a light-permeable member 122 are not effected) are respectively expressed as (−Fx, Fy, Fz) and (Fx, Fy, Fz), n1 denotes the refractive index of the light guide 129, and λ denotes the optical wavelength of the reflected light beam 15'.

A light-permeable member 122 composed of TiO₂ as a uniaxial anisotropic crystal is provided inside of the light guide 129. The boundary between the light guide 129 and the unaxial anisotropic crystal should preferably be provided with non-reflection coating. By way of example, the light-permeable member 122 has a length extending over the overall width of the light guide 129 so that both the guided light beam 15' converged by the first FG 31 and the guided light beam 15' converged by the second FG 32 pass through the light-permeable member 122. The light-permeable member 122 is disposed so that an optical axis thereof extends at an angle normal to the drawing sheet in FIG. 9, i.e. in the x-axis direction in FIG. 10. Also, the light-permeable member 122 has beam passage surfaces 122a and 122b oblique with respect to the directions of advance of the guided light beams 15', 15'. Therefore, the guided light beams 15', 15' passing through the light-permeable member 122 are refracted as shown in FIG. 9. In this embodiment, the light-permeable member 122 is formed of TiO₂ wherein a refractive index ne with respect to ex-
traordinary light is larger than a refractive index no with respect to ordinary light (ne=2.872, no=2.584 for light having a wavelength of 633 nm). Accordingly, a s-polarized light component 15S of each of the guided light beams 15', 15' is refracted more largely than a p-polarized light component 15P, and the s-polarized light component 15S and the p-polarized light component 15P are separated from each other and converged. Also, the light guide 129 is provided with an edge face 129c obliquely cut to extend along the positions of convergence of the guided light beams 15', 15', 15', 15' thus separated from one another. A first photodetector 124 and a second photodetector 125 for respectively detecting the p-polarized light components 15P, 15P converged by the first FG 31 and the second FG 32 among the guided light beams 15', 15', 15', 15' are provided on the edge face 129c. Also, a third photodetector 126 and a fourth photodetector 127 for respectively detecting the s-polarized light components 15S, 15S converged by the first FG 31 and the second FG 32 are provided on the edge face 129c. The first photodetector 124 is composed of photodiodes PD11 and PD12 divided from each other by a gap extending in parallel with a plane on which the y axis lies and which is normal to the surface 129a of the light guide 129. The photodetectors 125, 126 and 127 are respectively composed of photodiodes PD13 and PD14, photodiodes PD15 and PD16, and photodiodes PD17 and PD18 which are divided in the same manner as the photodiodes PD11 and PD12.

By way of example, the photodiode PD11 has the configuration as shown in FIG. 3, and the photodiodes PD12 to PD18 are constituted in the same manner as the photodiode PD11.

Alternatively, external photodiodes may be closely contacted with the edge face 129c by adhesion. In this case, the edge face 129c should preferably be provided with non-reflection coating.

As shown in FIG. 10, the outputs of the photodiodes PD11 and PD12 for detecting the p-polarized light component of one of the guided light beams 15', 15' are added together by an addition amplifier 134, and the outputs of the photodiodes PD13 and PD14 for detecting the p-polarized light component of the other of the guided light beams 15', 15' are added together by an addition amplifier 135. On the other hand, the outputs of the photodiodes PD15 and PD16 for detecting the s-polarized light component of one of the guided light beams 15', 15' are added together by an addition amplifier 136, and the outputs of the photodiodes PD17 and PD18 for detecting the s-polarized light component of the other of the guided light beams 15', 15' are added together by an addition amplifier 137. The outputs of the addition amplifiers 134 and 135 are added together by an addition amplifier 138, and the outputs of the addition amplifiers 136 and 137 are added together by an addition amplifier 139. Also, the outputs of the addition amplifiers 138 and 139 are fed to a differential amplifier 140, and the output D1 of the differential amplifier 140 is fed to a read-out circuit 141.

On the other hand, the outputs of the outer photodiodes PD11 and PD15 of the first photodetector 124 and the third photodetector 126 respectively for detecting the guided light beam 15' converged by the first FG 31 are added together by an addition amplifier 142, and the outputs of the inner photodiodes PD12 and PD16 are added together by an addition amplifier 143. The outputs of the outer photodiodes PD14 and PD18 of the second photodetector 125 and the fourth photodetector 127 respectively for detecting the guided light beam 15' converged by the second FG 32 are added together by an addition amplifier 145, and the outputs of the inner photodiodes PD13 and PD17 are added together by an addition amplifier 144. Also, the outputs of the addition amplifiers 142 and 143 are added together by an addition amplifier 146, and the outputs of the addition amplifiers 144 and 145 are added together by an addition amplifier 147. On the other hand, the outputs of the addition amplifiers 142 and 145 are added together by an addition amplifier 148, and the outputs of the addition amplifiers 143 and 144 are added together by an addition amplifier 149. The outputs of the addition amplifiers 146 and 147 are fed to a differential amplifier 150, and the outputs of the addition amplifiers 148 and 149 are fed to a differential amplifier 151. An output D2 of the differential amplifier 150 and an output D3 of the differential amplifier 151 are respectively fed to a tracking coil drive control circuit 152 and a focusing coil drive control circuit 153.

Operations of the pickup apparatus for a magneto-optical recording medium having the configuration as mentioned above will be described hereinbelow. The light beam (laser beam) 15 emitted by the semiconductor laser 16 and collimated by the collimator lens 17 passes through the light guide 129, and is converged by the objective lens 18 so that the light beam 15 is focused on the reflection surface 114 of the magneto-optical disk 113. The magneto-optical disk 113 is rotated by a rotation drive means (not shown) so that the track is moved in the direction as indicated by the arrow U at the incidence position of the light beam 15. As is well known, the track is a string of image signals, audio signals or the like recorded by use of the directions of magnetization as indicated by the arrows above the reflection surface 114 in FIG. 9. As the direction of magnetization is reversed, the direction of linear polarization of the light beam 15' reflected by the magneto-optical disk 113 rotates reversely with respect to the direction of linear polarization of the light beam 15' reflected by the unmagnetized part. Specially, the direction of linear polarization of the light beam 15' reflected by the part of the magneto-optical disk 113 magnetized in a direction rotates clockwise from the direction of polarization as indicated by the arrow H in FIG. 10, and the direction of linear polarization of the light beam 15' reflected by the part of the magneto-optical disk 113 magnetized in the reverse direction rotates counter-clockwise from the direction of polarization as indicated by the arrow H.

The reflected light beam 15' passes through the objective lens 18, and is diffracted and introduced into the light guide 129 by the FG 31 and the FG 32. The guided light beams 15', 15' which are thus introduced into and guided inside of the light guide 129 advance by repetition of total reflection between the surface 129a and the surface 129b, and are converged into two spots with the y axis intervening therebetween by the beam converging effects of the FG 31 and the FG 32. As mentioned above, the guided light beams 15', 15' passing through the light-permeable member 122 are divided into the p-polarized light components 15P, 15P and the s-polarized light components 15S, 15S. The p-polarized light components 15P, 15P are detected by the first photodetector 124 (i.e. the photodiodes PD11 and PD12) and the second photodetector 125 (i.e. the photodiodes PD13 and PD14) respectively. On the other hand, s-polarized light components 15S, 15S are detected by the third photodetector 126 (i.e. the photodiodes PD15 and PD16) and the fourth photodetector 127 (i.e. the photodiodes PD17 and PD18) respectively. When the direction of linear polarization of the reflected light beam 15' rotates clockwise from the direction of polarization as indicated by the arrow H, the p-polarized light components 15P, 15P of the guided light beams 15', 15' advancing inside of the light guide 129 increase, whereas the s-polarized light components 15S, 15S decrease. When the direction of linear polarization of the reflected light beam 15' rotates counter-clockwise from the direction of polarization as indicated by the arrow H, the p-polarized light components 15P, 15P of the guided light beams 15', 15' advancing inside of the light guide 129 decrease, whereas the s-polarized light components 15S, 15S increase. In the case where the p-polarized light components 15P, 15P increase, the output of the addition amplifier 138 becomes high, whereas the output of the addition amplifier 139 becomes low. On the other hand, in the case where the s-polarized light components 15S, 15S increase, the output of the addition amplifier 138 becomes low, whereas the output of the addition amplifier 139 becomes high. Therefore, by way of example, in the case where the gain of the addition amplifier 138 and the gain of the addition amplifier 139 are adjusted to appropriate values, the output of the differential amplifier 140 can be made "+" (plus) at the time the direction of linear polarization of the reflected light beam 15' is rotated clockwise from the direction as indicated by the arrow H in FIG. 10, and the output of the differential amplifier 140 can be made "−" (minus) at the time the direction of linear polarization of the reflected light beam 15' is rotated counter-clockwise from the direction as indicated by the arrow H. Accordingly, by discriminating the output D1 of the differential amplifier 140, the directions of magnetization of the magneto-optical disk 113, i.e. the recorded signals, can be detected.

The detection signals generated by the first photodetector 124, the second photodetector 125, the third photodetector 126 and the fourth photodetector 127 often include noise caused by, for example, fluctuations in optical intensity of the semiconductor laser 16, fluctuations in reflectivity of the recording magnetic film of the magneto-optical disk 113, and the crystal grains. The noise components are in phase with one another among the outputs of the the first photodetector 124, the second photodetector 125, the third photodetector 126 and the fourth photodetector 127. Therefore, by carrying out the differential detection of the signal components in the manner as mentioned above, the noise components are canceled, and read-out signals D1 having a high S/N ratio can be obtained.

In the aforesaid embodiment, the difference between the signal obtained by the addition of the output of the first photodetector 124 to the output of the second photodetector 125 and the signal obtained by the addition of the output of the third photodetector 126 to the output of the fourth photodetector 127 is detected. However, the signal detection can also be carried out by detecting the difference between the output signal of the first photodetector 124 and the output signal of the third photodetector 126, or the difference between the output signal of the second photodetector 125 and the output signal of the fourth photodetector 127. Also, the signal detection can be carried out by detecting fluctuations in the output of a single photodetector among the photodetectors 124 to 127. In this case, the output of the photodetector fluctuates in accordance with the tracking error. Therefore, the signal detection should preferably be carried out in the manner as in the aforesaid embodiment in order to prevent signal detection error caused by such fluctuations.

Also, in this embodiment, the direction of polarization of the reflected light beam 15' impinging upon the FG 31 and the FG 32 makes an angle of approximately 45° with respect to the x axis, and the optical axis of the uniaxial anisotropic crystal constituting the light-permeable member 122 is parallel with the x axis. Therefore, the direction of polarization of each guided light beam 15' impinging upon the light-permeable member 122 makes an angle of approximately 45° with respect to the optical axis of the uniaxial anisotropic crystal. In this case, the level of the differential output D1 generated by the differential amplifier 140 becomes the maximum, and therefore the recorded signals can be read out accurately.

The block 12 is moved normal to or approximately normal to the direction as indicated by the arrow U by the optical system feed motor as mentioned above, whereby the incidence position (the position in the radial direction of the magneto-optical disk 113) of the light beam 15 upon the magneto-optical disk 113 is changed and the recorded signals are read out sequentially. The tracking control will be described hereinbelow. When the center of the reflected light beam 15' is positioned exactly between the FG 31 and the FG 32, the optical amounts detected by the first photodetector 124 and the third photodetector 126 and the optical amounts detected by the second photodetector 125 and the fourth photodetector 127 coincide with each other. Therefore, in this case, the outputs of the addition amplifiers 146 and 147 become equal to each other, and the output D2 of the differential amplifier 150 becomes 0 (zero). On the other hand, when the incidence position of the light beam 15 upon the optical disk 113 becomes incorrect and the optical intensity distribution of the reflected light beam 15' is deviated upwardly in FIG. 10, the optical amounts detected by the first photodetector 124 and the third photodetector 126 exceed the optical amounts detected by the second photodetector 125 and the fourth photodetector 127. Therefore, in this case, the output D2 of the differential amplifier 150 becomes "+" (plus). Conversely, when the optical intensity distribution of the reflected light beam 15' is deviated downwardly in FIG. 10, the output D2 of the differential amplifier 150 becomes "−" (minus). Specifically, the output D2 of the differential amplifier 150 represents the direction of the tracking error (the x-axis direction in FIG. 10). The output D2 is fed as a tracking error signal to the tracking coil drive control circuit 152. Upon receiving the tracking error signal D2, the tracking coil drive control circuit 152 feeds an electric current It in accordance with the direction of the tracking error represented by the signal D2 to the tracking coil 19 for moving the objective lens 18 in a direction that cancels the tracking error. In this manner, the light beam 15 is made to impinge accurately upon the center of the signal string.

The focusing control will be described hereinbelow. When the light beam 15 is focused accurately on the reflection surface 114 of the magneto-optical disk 113, the p-polarized light component of the guided light beam 15' converged by the FG 31 is converged at the middle position between the photodiodes PD11 and PD12, and the s-polarized light component of the guided light beam 15' converged by the FG 31 is converged at the middle position between the photodiodes PD15 and PD16. At this time, the p-polarized light component of the guided light beam 15' converged by the FG 32 is converged at the middle position between the photodiodes PD13 and PD14, and the s-polarized light component of the guided light beam 15' converged by the FG 32 is converged at the middle position between the photodiodes PD17 and PD18. Therefore, the output of the addition amplifier 148 and the output of the addition amplifier 149 become equal to each other, and the output D3 of the differential amplifier 151 becomes 0 (zero). On the other hand, in the case where the light beam 15 is converged at a position forward from the reflection surface 114, the reflected light beam 15' impinges in the converged form upon the FG 31 and the FG 32, and the incidence positions of the guided light beams 15', 15', 15', 15' upon the photodetectors 124, 125, 126 and 127 are deviated inward, i.e. toward the photodiodes PD12 and PD16 and toward the photodiodes PD13 and PD17. Therefore, in this case, the output of the addition amplifier 148 becomes lower than the output of the addition amplifier 149, and the output D3 of the differential amplifier 151 becomes "−" (minus). Conversely, in the case where the light beam 15 is converged at a position backward from the reflection surface 114, the reflected light beam 15' impinges in the divergent form upon the FG 31 and the FG 32, and the incidence positions of the guided light beams 15', 15', 15', 15' upon the photodetectors 124, 125, 126 and 127 are deviated outward, i.e. toward the photodiodes PD11 and PD15 and toward the photodiodes PD14 and PD18. Therefore, in this case, the output of the addition amplifier 148 becomes higher than the output of the addition amplifier 149, and the output D3 of the differential amplifier 151 becomes "+" (plus). Thus the output D3 of the differential amplifier 151 represents the direction of the focusing error. The output D3 is fed as a focusing error signal to the focusing coil drive control circuit 153. Upon receiving the focusing error signal D3, the focusing coil drive control circuit 153 feeds an electric current If in accordance with the direction of the focusing error represented by the signal D3 to the focusing coil 20 for moving the objective lens 18 in a direction that cancels the focusing error. In this manner, the light beam 15 is made to converge accurately onto the reflection surface 114 of the magneto-optical disk 113.

In order to detect the tracking error and the focusing error, at least the p-polarized light components or the s-polarized light components converged by the first FG 31 and the second FG 32 may be detected. In the case where the differential detection of the recorded signals is not to be carried out, the recorded signals can read out by detecting only the p-polarized light component or the s-polarized light component converged by the FG 31 or the FG 32 among the aforesaid p-polarized light components and the s-polarized light components. Therefore, at least the photodetectors 124 and 125 or the photodetectors 126 and 127 may be provided. Also, only three photodetectors among the photodetectors 124 to 127 may be provided in the case where the differential detection is to be carried out by detecting the p-polarized light component and the s-polarized light component of the guided light beam 15' converged by the first FG 31 or the second FG 32, and the tracking error and the focusing error are to be detected by detecting the p-polarized light components or the s-polarized light components converged by the first FG 31 and the second FG 32.

However, the tracking error and the focusing error should preferably be detected based on the signal obtained by adding the detection signal on the p-polarized light component to the detection signal on the s-polarized light component as in the aforesaid embodiment. In this case, the high-frequency component modulated by the recorded signals is not superposed on the error detection signal.

Also, in this embodiment, the light absorbing member 55 should preferably be provided on an edge face 129d of the light guide 129, or the edge face 129d should preferably be processed into a rough surface for the reasons as mentioned above.

Instead of using $TiO_2$ wherein ne>no, the light-permeable member 122 may be formed of any other material, including the material wherein ne<no. For example, $LiTaO_3$ and ZnO may be used as the material wherein ne>no. On the other hand, the material wherein ne<no may be, for example, $LiNbO_3$, ADP ($NH_4H_2PO_4$), KDP ($KH_2PO_4$), rock crystal ($SiO_2$), or calcite ($CaCO_3$).

Another embodiment of the first pickup apparatus for a magneto-optical recording medium in accordance with the present invention will hereinbelow be described with reference to FIG. 11. In this embodiment, the collimator lens 17 in the embodiment shown in FIG. 9 is omitted, and the light beam 15' reflected by the magneto-optical disk 113 is taken in the converged form into the light guide 129. Also with this configuration, the recorded signals, tracking error and focusing error can be detected by detecting the guided light beams 15', 15', 15', 15' converged inside of the light guide 129 by, for example, the first photodetector 124, the second photodetector 125, the third photodetector 126 and the fourth photodetector 127 of the types as shown in FIG. 10, and processing the detection signals in the manner as mentioned above.

Figure 11:
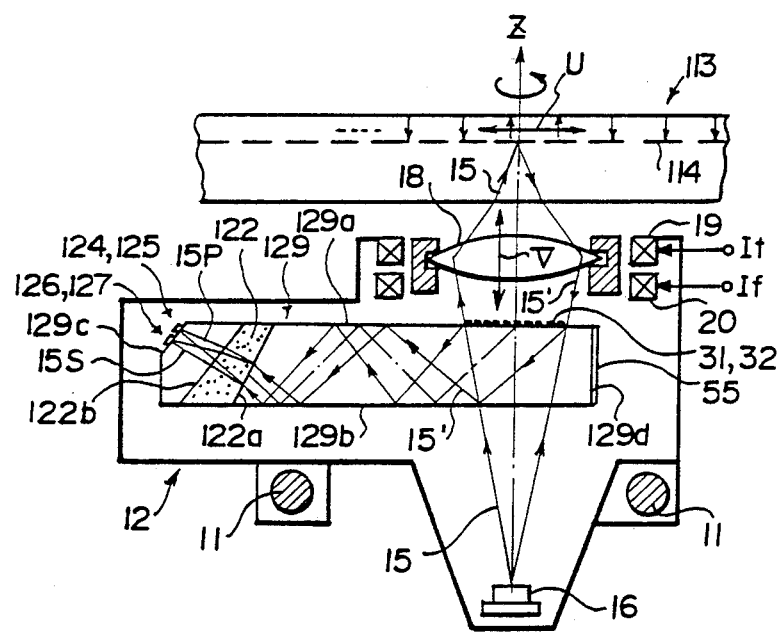
FIGS. 11, 12, 13 and 14 are side views showing further embodiments of the first pickup apparatus for a magneto-optical recording medium in accordance with the present invention.

The m'th grating pattern of each of the FG 31 and the FG 32 in the embodiment shown in FIG. 11 is expressed as Formula (2) when the space coordinates and the coordinates of the positions of beam convergence by the FG 31 and the FG 32 are defined in the same manner as in the embodiment shown in FIG. 9, n1 denotes the refractive index of the light guide 129, and the coordinates of the light source are defined as (0, 0, Lz).

Figure 12:
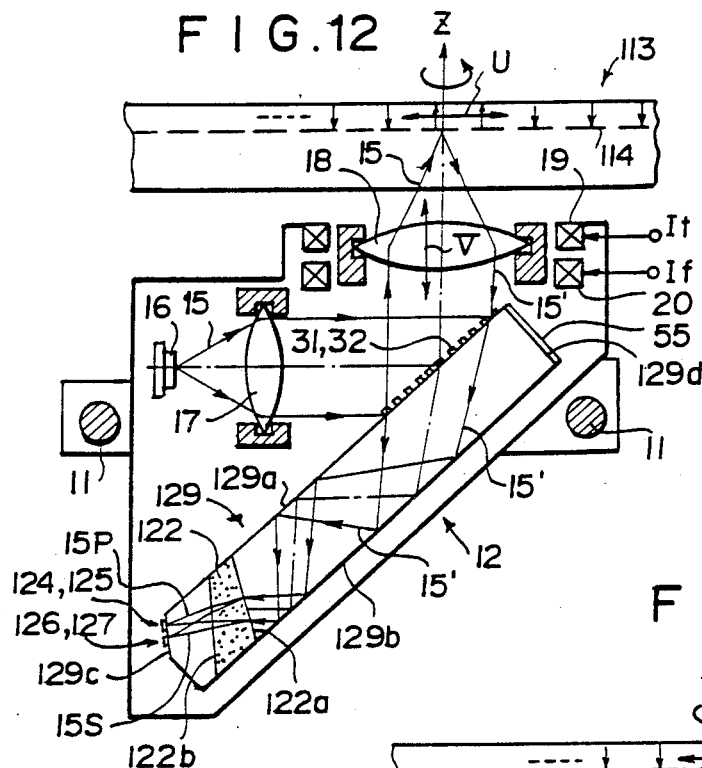

A further embodiment of the first pickup apparatus for a magneto-optical recording medium in accordance with the present invention will hereinbelow be described with reference to FIG. 12. In this embodiment, the light guide 129 is formed of a material exhibiting a substantially large refractive index, and the light beam 15 is reflected by the surface 129a of the light guide 129 toward the magneto-optical disk 113. Also in this case, the light beam 15' reflected by the magneto-optical disk 113 is diffracted and converged by the FG 31 and the FG 32.

Figure 13:
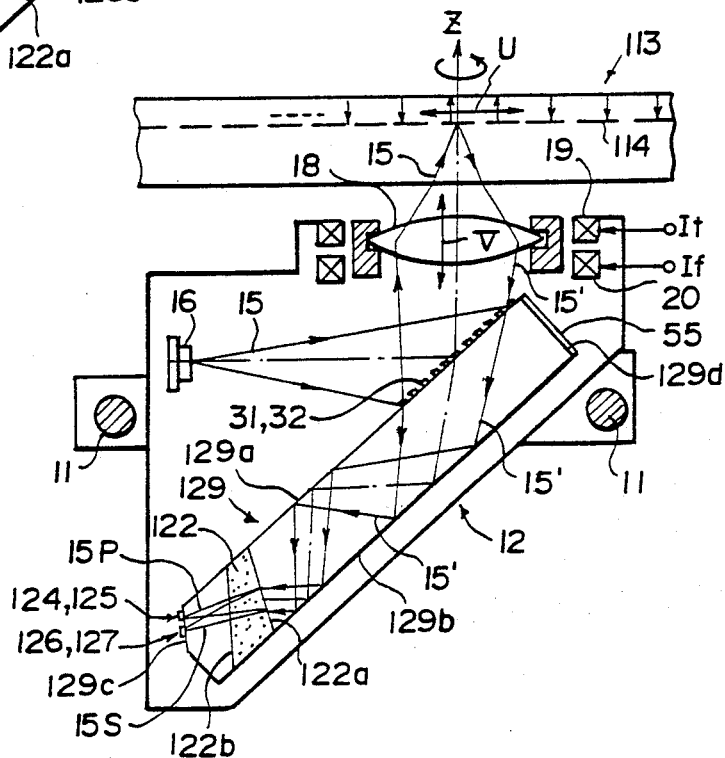

FIG. 13 shows a still further embodiment of the first pickup apparatus for a magneto-optical recording medium in accordance with the present invention. In this embodiment, the light beam 15 emitted by the semiconductor laser 16 in the divergent form is reflected in this form by the surface 129a of the light guide 129 toward the magneto-optical disk 113.

Another embodiment of the first pickup apparatus for a magneto-optical recording medium in accordance with the present invention will hereinbelow be described with reference to FIG. 14. In this embodiment, the light guide 129 and the objective lens 18 are secured to a single head 160, and the head 160 is supported moveably in the tracking direction and in the focusing direction with respect to the block 12. The head 160 is moved by the tracking coil 19 and the focusing coil 20. In this manner, tracking control can be carried out more accurately as in the embodiment shown in FIG. 7.

Figure 14:
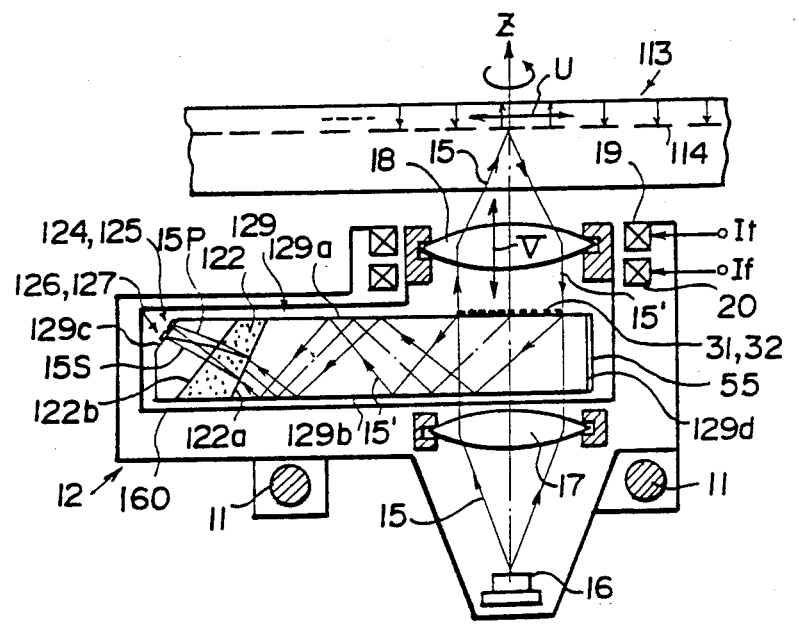

In the embodiment shown in FIG. 14, the semiconductor laser 16 and the collimator lens 17 may be secured to the head 160 as well as the light guide 129 and the objective lens 18, and may be moved integrally with the light guide 129 and the objective lens 18.

Figure 15:
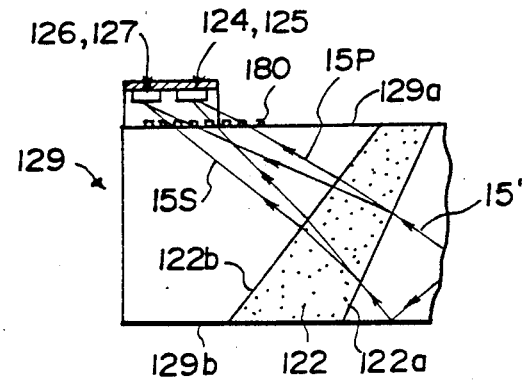
FIG. 15 is a side view showing an example of the photodetector used in the first pickup apparatus for a magneto-optical recording medium in accordance with the present invention.

In the aforesaid five embodiments shown in FIGS. 9 to 14, the first photodetector 124, the second photodetector 125, the third photodetector 126 and the fourth photodetector 127 are provided on the obliquely cut surface 129c of the light guide 129. However, the photodetectors 124, 125, 126 and 127 may be provided in any other manner on the light guide 129. For example, as shown in FIG. 15, the photodetectors 124, 125, 126 and 127 may be disposed close to the surface 129a of the light guide 129. Also, in this case, a diffraction grating 180 for radiating the guided light beam 15', 15', 15', 15' out of the light guide 129 may be provided on the surface 129a of the light guide 129, and the guided light beam 15', 15', 15', 15' radiated out of the light guide 129 may be received by the photodetectors 124, 125, 126 and 127.

Embodiments of the second pickup apparatus for a magneto-optical recording medium in accordance with the present invention will hereinbelow be described with reference to FIGS. 16 to 23.

Figure 16:
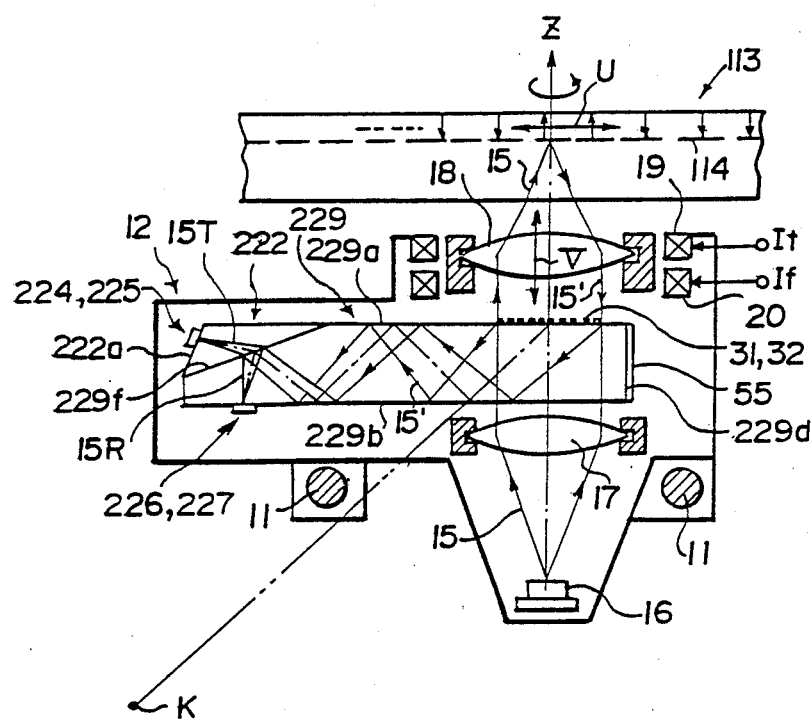
FIG. 16 is a side view showing an embodiment of the second pickup apparatus for a magneto-optical recording medium in accordance with the present invention.
Figure 17:
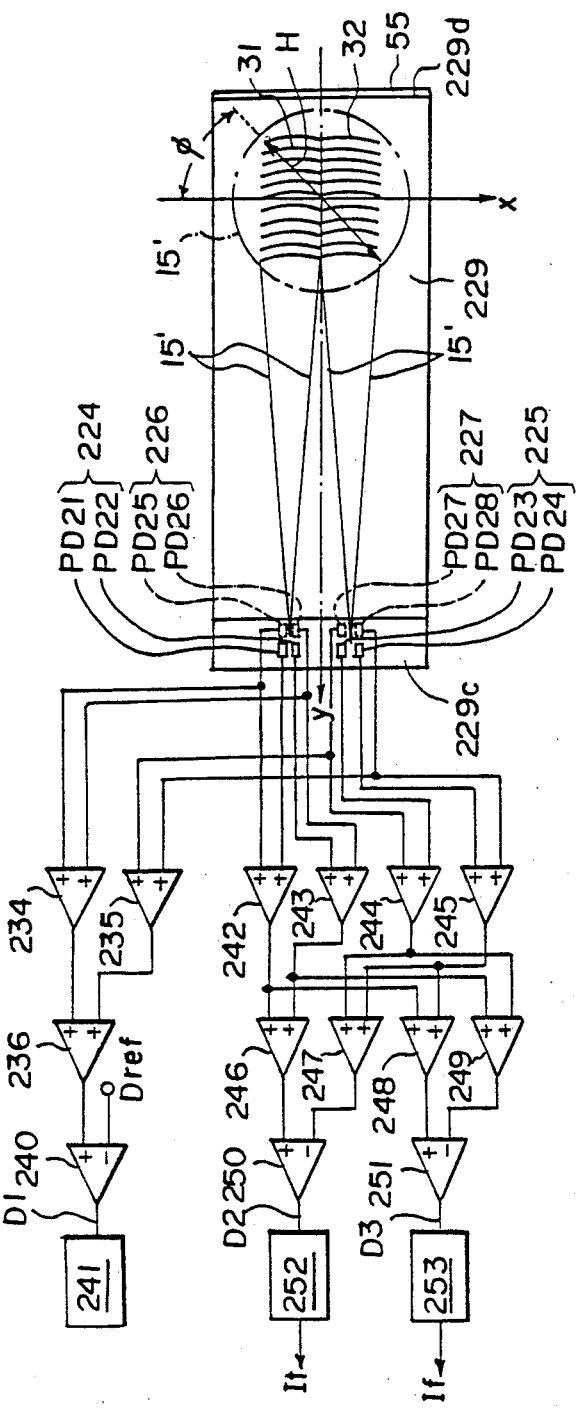
FIG. 17 is a schematic view showing the top plan shape of the light guide in the embodiment shown in FIG. 16 and the electric circuit used for the embodiment.

FIG. 16 shows an embodiment of the second pickup apparatus for a magneto-optical recording medium in accordance with the present invention, and FIG. 17 shows the top plan view of an optical waveguide in the embodiment shown in FIG. 16 and an electric circuit used for the embodiment shown in FIG. 16. As shown in FIG. 16, a flat plate-shaped light guide 229 composed of an optical glass or the like is disposed between the collimator lens 17 and the objective lens 18 in such a direction that a surface 229a of the light guide 229 receives a light beam 15' reflected by the magneto-optical disk 113. Also, as shown in FIG. 17, the first FG 31 and the second FG 32 are provided adjacent to each other on the surface 229a of the light guide 229 at the position upon which the reflected light beam 15' impinges. The first FG 31 and the second FG 32 respectively diffract and introduce the reflected light beam 15' into the light guide 229, make the reflected light beam 15' advance inside of the light guide 229 toward an edge face of the light guide 229 by repetition of total reflection between the surface 229a and a surface 229b of the light guide 229 opposite to the surface 229a, and converge the reflected light beam 15' (guided light beams 15', 15') thus guided through the light guide 229 into a single spot. As shown in FIG. 17, the first FG 31 and the second FG 32 are disposed side by side so that a y axis on the light guide 229 normal to the tracking direction and passing through nearly the center of the reflected light beam 15' intervenes between the FG 31 and the FG 32. Also, the FG 31 and the FG 32 are formed to converge the guided light beams 15', 15' to positions spaced from each other with the y axis intervening therebetween. The light guide 229 is disposed in such a direction that the x axis and the direction of linear polarization of the reflected light beam 15' as indicated by the arrow H makes an angle φ (generally within the range of 10° to 45°).

The m'th grating pattern of each of the FG 31 and the FG 32 having the aforesaid effects is expressed as Formula (1) when the space coordinates are defined by the y axis, the x axis, i.e. the axis in the tracking direction, shown in FIG. 17 and a z axis passing through the intersecting point of the x axis with the y axis and normal to the x and y axes, and coordinates of the positions of beam convergence by the FG 31 and the FG 32 (i.e. the positions of convergence as indicated by a point K in FIG. 16 in the case where total reflection in the light guide 229 is not effected) are respectively expressed as (−Fx, Fy, Fz) and (Fx, Fy, Fz), n1 denotes the refractive index of the light guide 229, and λ denotes the optical wavelength of the reflected light beam 15'.

Figure 23:
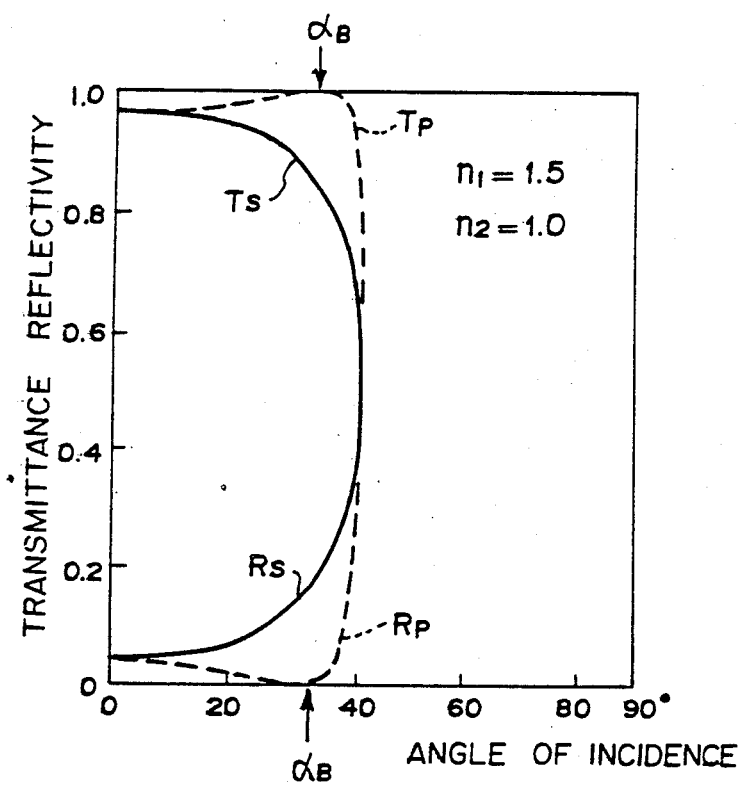
FIG. 23 is a graph showing the relationships between the angles of incidence of the p-polarized light component and the s-polarized light component upon the light guide edge face, and the transmittances and reflectivities at the light guide edge face in the second pickup apparatus for a magneto-optical recording medium in accordance with the present invention.

The light guide 229 is provided with an obliquely cut light guide edge face 229f near the positions of convergence of the guided light beams 15', 15'. A light-permeable member 222 formed of a material having a refractive index lower than the refractive index of the material of the light guide 229 is secured in close contact with the light guide edge face 229f. Specifically, the light guide edge face 229f constitutes the boundary between the light guide 229 and the light-permeable member 222. Also, the light guide edge face 229f is provided at such an angle that the guided light beams 15', 15' impinge thereupon at the Brewster angle αB. As mentioned above, the Brewster angle αB is expressed as $$\alpha B = \tan^{-1}(n2/n1)$$

wherein n1 denotes the refractive index of the light guide 229, and n2 denotes the refractive index of the light-permeable member 222. FIG. 23 shows the relationships between the angles of incidence α of the p-polarized light component and the s-polarized light component of the guided light beam 15' upon the light guide edge face 229f, and the transmittances and reflectivities at the edge face 229f in the case where n1=1.5 and n2=1.0. In FIG. 23, Tp and Rp denote the transmittance and reflectivity of the p-polarized light component respectively, and Ts and Rs denote the transmittance and reflectivity of the s-polarized light component respectively. As shown in FIG. 23, in the case where the guided light beam 15' impinges at the Brewster angle αB upon the light guide edge face 229f, the reflectivity at the p-polarized light component at the light guide edge face 229f is 0 (zero). Therefore, a guided light beam 15R reflected by the light guide edge face 229f is composed of the s-polarized light component alone, whereas a guided light beam 15T passing through the light guide edge face 229f contains both the p-polarized light component and the s-polarized light component. Though the guided light beam 15' impinging upon the light guide edge face 229f is in the converged form, the converging power of the focusing grating is small, and therefore the guided light beam 15' may be regarded as a nearly collimated light beam in this case. Accordingly, an analyzing function based on the Brewster angle is achieved.

The light-permeable member 222 is provided with an edge face 222a obliquely cut in the region of the optical path of the guided light beam 15T passing through the light guide edge face 229f. A first photodetector 224 and a second photodetector 225 for respectively detecting the guided light beams 15T, 15T converged by the first FG 31 and the second FG 32 are provided on the edge face 222a. The guided light means 15T, 15T pass through a material having the refractive index n2 smaller than the refractive index n1 of the light guide 229, and therefore the edge face 222a is provided at the focal position that reflects the difference in the refractive index. On the other hand, a third photodetector 226 and a fourth photodetector 227 for respectively detecting the guided light beams 15R, 15R reflected by the light guide edge face 229f are provided on the surface 229b of the light guide 229. The third photodetector 226 and the fourth photodetector 227 respectively detect the guided light beams 15R, 15R converged by the first FG 31 and the second FG 32. The first photodetector 224 is composed of photodiodes PD21 and PD22 divided from each other by a gap extending in parallel with a plane on which the y axis lies and which is normal to the surface 229a of the light guide 229. The photodetectors 225, 226 and 227 are respectively composed of photodiodes PD23 and PD24, photodiodes PD25 and PD26, and photodiodes PD27 and PD28 which are divided in the same manner as the photodiodes PD21 and PD22.

By way of example, the photodiode PD21 has the configuration as shown in FIG. 3, and the photodiodes PD22 to PD28 are constituted in the same manner as the photodiode PD21.

Alternatively, external photodiodes may be closely contacted with the edge face 222a and the light guide surface 229b by adhesion. In this case, the respective light beam radiating face should preferably be provided with non-reflection coating.

As shown in FIG. 17, the outputs of the photodiodes PD25 and PD26 for detecting the guided light beams 15R, 15R of one of the guided light beams 15', 15' are added together by an addition amplifier 234, and the outputs of the photodiodes PD27 and PD28 for detecting the guided light beams 15R, 15R of the other of the guided light beams 15', 15' are added together by an addition amplifier 235. The outputs of the addition amplifiers 234 and 235 are added together by an addition amplifier 236. Also, the output of the addition amplifiers 236 is fed to one of input terminals of a differential amplifier 240, and a reference signal Dref is fed to the other of the input terminals of the differential amplifier 240. The output D1 of the differential amplifier 240 is fed to a read-out circuit 241.

On the other hand, the outputs of the outer photodiodes PD21 and PD25 of the first photodetector 224 and the third photodetector 226 respectively for detecting the guided light beams 15T and 15R converged by the first FG 31 are added together by an addition amplifier 242, and the outputs of the inner photodiodes PD22 and PD26 are added together by an addition amplifier 243. The outputs of the outer photodiodes PD24 and PD28 of the second photodetector 225 and the fourth photodetector 227 respectively for detecting the guided light beams 15T and 15R converged by the second FG 32 are added together by an addition amplifier 245, and the outputs of the inner photodiodes PD23 and PD27 are added together by an addition amplifier 244. Also, the outputs of the addition amplifiers 242 and 243 are added together by an addition amplifier 246, and the outputs of the addition amplifiers 244 and 245 are added together by an addition amplifier 247. On the other hand, the outputs of the addition amplifiers 242 and 245 are added together by an addition amplifier 248, and the outputs of the addition amplifiers 243 and 244 are added together by an addition amplifier 249. The outputs of the addition amplifiers 246 and 247 are fed to a differential amplifier 250, and the outputs of the addition amplifiers 248 and 249 are fed to a differential amplifier 251. An output D2 of the differential amplifier 250 and an output D3 of the differential amplifier 251 are respectively fed to a tracking coil drive control circuit 252 and a focusing coil drive control circuit 253.

Operations of the pickup apparatus for a magneto-optical recording medium having the configuration as mentioned above will be described hereinbelow. The light beam (laser beam) 15 emitted by the semiconductor laser 16 and collimated by the collimator lens 17 passes through the light guide 229, and is converged by the objective lens 18 so that the light beam 15 is focused on the reflection surface 114 of the magneto-optical disk 113. As mentioned above, the direction of linear polarization of the light beam 15' reflected by the part of the magneto-optical disk 113 magnetized in a direction rotates clockwise from the direction of polarization as indicated by the arrow H in FIG. 17, and the direction of linear polarization of the light beam 15' reflected by the part of the magneto-optical disk 113 magnetized in the reverse direction rotates counter-clockwise from the direction of polarization as indicated by the arrow H.

The reflected light beam 15' passes through the objective lens 18, and is diffracted and introduced into the light guide 229 by the FG 31 and the FG 32. The guided light beams 15', 15' which are thus introduced into and guided inside of the light guide 229 advance by repetition of total reflection between the surface 229a and the surface 229b, and are converged into two spots with the y axis intervening therebetween by the beam converging effects of the FG 31 and the FG 32. As mentioned above, only the s-polarized light components are reflected as the guided light beams 15R, 15R by the light guide edge face 229f constituting the boundary with respect to the light-permeable member 222. The guided light beams 15R, 15R are detected by the third photodetector 226 (i.e. the photodiodes PD25 and PD26) and the fourth photodetector 227 (i.e. the photodiodes PD27 and PD28) respectively. When the direction of linear polarization of the reflected light beam 15' rotates clockwise from the direction of polarization as indicated by the arrow H, the p-polarized light components of the guided light beams 15', 15' advancing inside of the light guide 229 increase, whereas the s-polarized light components decrease. When the direction of linear polarization of the reflected light beam 15' rotates counter-clockwise from the direction of polarization as indicated by the arrow H, the p-polarized light components of the guided light beams 15', 15' advancing inside of the light guide 229 decrease, whereas the s-polarized light components increase. In the case where the s-polarized light components decrease, the output of the addition amplifier 236 becomes low. On the other hand, in the case where the s-polarized light components increase, the output of the addition amplifier 236 becomes high. Therefore, by way of example, in the case where the value of the reference signal Dref is adjusted to an appropriate value, the output of the differential amplifier 240 can be made "−" (minus) at the time the direction of linear polarization of the reflected light beam 15' is rotated clockwise from the direction as indicated by the arrow H in FIG. 17, and the output of the differential amplifier 240 can be made "+" (plus) at the time the direction of linear polarization of the reflected light beam 15' is rotated counter-clockwise from the direction as indicated by the arrow H. Accordingly, by discriminating the output D1 of the differential amplifier 240, the directions of magnetization of the magneto-optical disk 113, i.e. the recorded signals, can be detected.

In the aforesaid embodiment, the recorded signals are detected based on the signal obtained by the addition of the output of the third photodetector 226 to the output of the fourth photodetector 227. However, the signal detection can be carried out by detecting fluctuations in the output of the photodetector 226 or the photodetector 227. In this case, the output of the photodetector fluctuates in accordance with the tracking error. Therefore, the signal detection should preferably be carried out in the manner as in the aforesaid embodiment in order to prevent signal detection error caused by such fluctuations.

The block 12 is moved normal to or approximately normal to the direction as indicated by the arrow U by the optical system feed motor as mentioned above, whereby the incidence position (the position in the radial direction of the magneto-optical disk 113) of the light beam 15 upon the magneto-optical disk 113 is changed and the recorded signals are read out sequentially.

As in the case of the aforesaid differential amplifier 150 shown in FIG. 10, the output D2 of the differential amplifier 250 represents the direction of the tracking error (the x-axis direction in FIG. 17). The output D2 is fed as a tracking error signal to the tracking coil drive control circuit 252. Upon receiving the tracking error signal D2, the tracking coil drive control circuit 252 feeds an electric current It in accordance with the direction of the tracking error represented by the signal D2 to the tracking coil 19 for moving the objective lens 18 in a direction that cancels the tracking error. In this manner, the light beam 15 is made to impinge accurately upon the center of the signal string.

The focusing control will be described hereinbelow. When the light beam 15 is focused accurately on the reflection surface 114 of the magneto-optical disk 113, the guided light beam 15T converged by the FG 31 is converged at the middle position between the photodiodes PD21 and PD22, and the guided light beam 15R converged by the FG 31 is converged at the middle position between the photodiodes PD25 and PD26. At this time, the guided light beam 15T converged by the FG 32 is converged at the middle position between the photodiodes PD23 and PD24, and the guided light beam 15R converged by the FG 32 is converged at the middle position between the photodiodes PD27 and PD28. Therefore, the output of the addition amplifier 248 and the output of the addition amplifier 249 become equal to each other, and the output D3 of the differential amplifier 251 becomes 0 (zero). On the other hand, in the case where the light beam 15 is converged at a position forward from the reflection surface 114, the output D3 of the differential amplifier 251 becomes "−" (minus). Conversely, in the case where the light beam 15 is converged at a position backward from the reflection surface 114, the output D3 of the differential amplifier 251 becomes "+" (plus). Thus the output D3 of the differential amplifier 251 represents the direction of the focusing error. The output D3 is fed as a focusing error signal to the focusing coil drive control circuit 253. Upon receiving the focusing error signal D3, the focusing coil drive control circuit 253 feeds an electric current If in accordance with the direction of the focusing error represented by the signal D3 to the focusing coil 20 for moving the objective lens 18 in a direction that cancels the focusing error. In this manner, the light beam 15 is made to converge accurately onto the reflection surface 114 of the magneto-optical disk 113.

In order to detect the tracking error and the focusing error, at least the guided light beams 15T, 15T or the guided light beams 15R, 15R converged by the first FG 31 and the second FG 32 may be detected. Also, as for the guided light beams 15T, 15T containing both the p-polarized light components and the s-polarized light components, the degrees of increase of the optical amounts differ between when the p-polarized light components increase and when the s-polarized light components increase. Therefore, the recorded signals can also be read out by detecting the fluctuations in the optical amounts of the guided light beams 15T, 15T. Accordingly, in the second pickup apparatus for a magneto-optical recording medium in accordance with the present invention, at least the photodetectors 224 and 225 or the photodetectors 226 and 227 may be provided.

However, the tracking error and the focusing error should preferably be detected based on the signal representing the sum of the p-polarized light component and the s-polarized light component as in the aforesaid embodiment. In this case, the high-frequency component modulated by the recorded signals is not superposed on the error detection signal.

Also, in this embodiment, the light absorbing member 55 should preferably be provided on an edge face 229d of the light guide 229, or the edge face 229d should preferably be processed into a rough surface for the reasons as mentioned above.

Also, in the aforesaid embodiment, the light-permeable member 222 is secured in close contact with the light guide edge face 229f. However, the light-permeable member 222 may not be provided, and the guided light beams 15T, 15T passing through the light guide edge face 229f may be directly radiated to ambient air and detected.

Another embodiment of the second pickup apparatus for a magneto-optical recording medium in accordance with the present invention will hereinbelow be described with reference to FIG. 18. In this embodiment, the collimator lens 17 in the embodiment shown in FIG. 16 is omitted, and the light beam 15' reflected by the magneto-optical disk 113 is taken in the converged form into the light guide 229. Also with this configuration, the recorded signals, tracking error and focusing error can be detected by detecting the guided light beams 15T, 15T, 15R, 15R converged inside of the light guide 229 by, for example, the first photodetector 224, the second photodetector 225, the third photodetector 226 and the fourth photodetector 227 of the types as shown in FIG. 17, and processing the detection signals in the manner as mentioned above.

Figure 18:
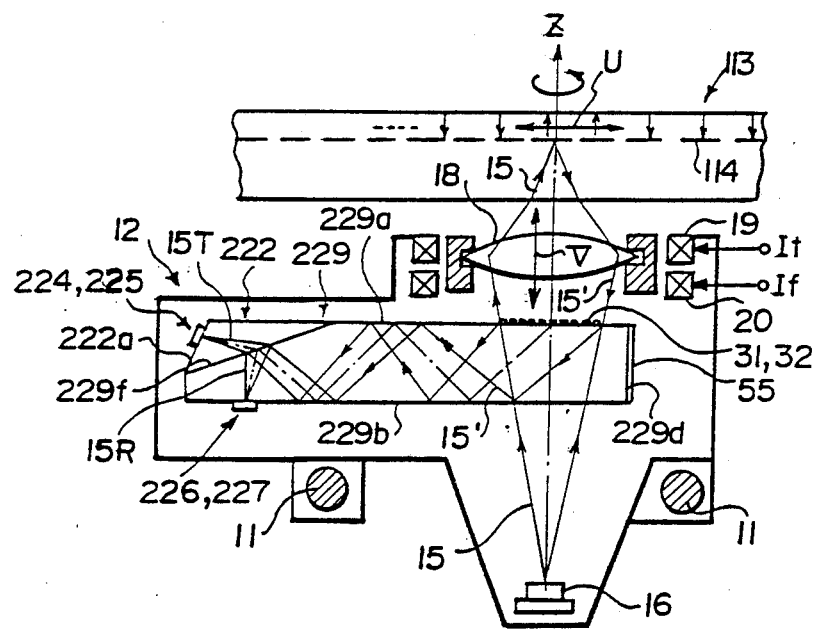
FIGS. 18, 19, 20 and 21 are side views showing further embodiments of the second pickup apparatus for a magneto-optical recording medium in accordance with the present invention.

The m'th grating pattern of each of the FG 31 and the FG 32 in the embodiment shown in FIG. 18 is expressed as Formula (2) when the space coordinates and the coordinates of the positions of beam convergence by the FG 31 and the FG 32 are defined in the same manner as in the embodiment shown in FIG. 16, n1 denotes the refractive index of the light guide 229, and the coordinates of the light source are defined as (0, 0, Lz).

Figure 19:
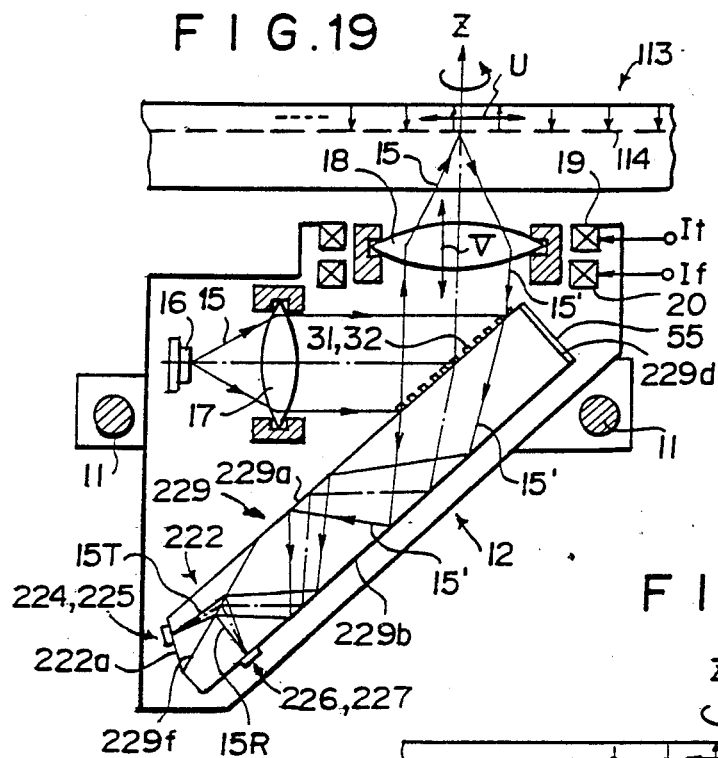

A further embodiment of the second pickup apparatus for a magneto-optical recording medium in accordance with the present invention will hereinbelow be described with reference to FIG. 19. In this embodiment, the light guide 229 is formed of a material exhibiting a substantially large refractive index, and the light beam 15 is reflected by the surface 229a of the light guide 229 toward the magneto-optical disk 113. Also in this case, the light beam 15' reflected by the magneto-optical disk 113 is diffracted and converged by the FG 31 and the FG 32.

Figure 20:
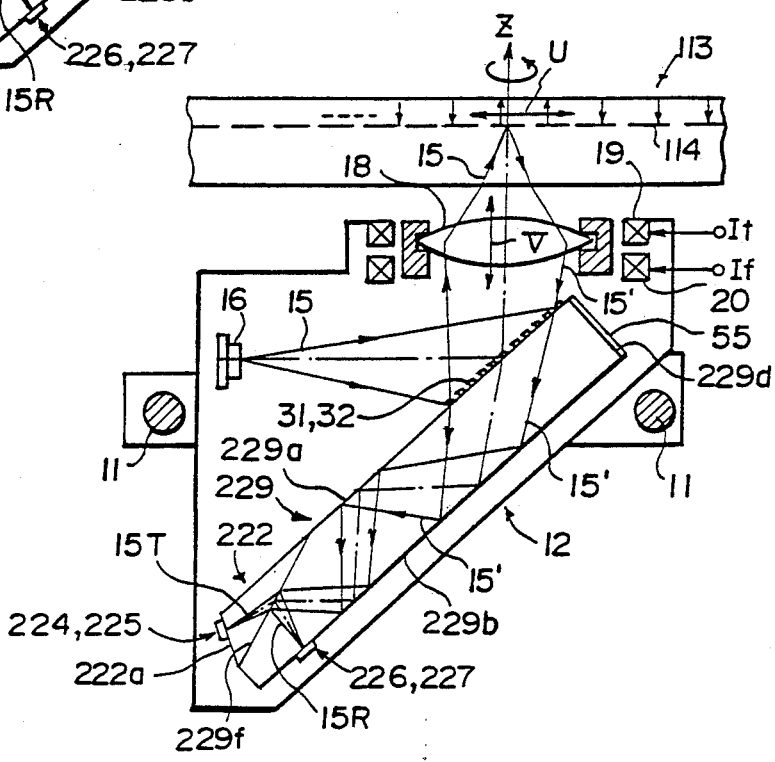

FIG. 20 shows a still further embodiment of the second pickup apparatus for a magneto-optical recording medium in accordance with the present invention. In this embodiment, the light beam 15 emitted by the semiconductor laser 16 in the divergent form is reflected in this form by the surface 229a of the light guide 229 toward the magneto-optical disk 113.

Figure 21:
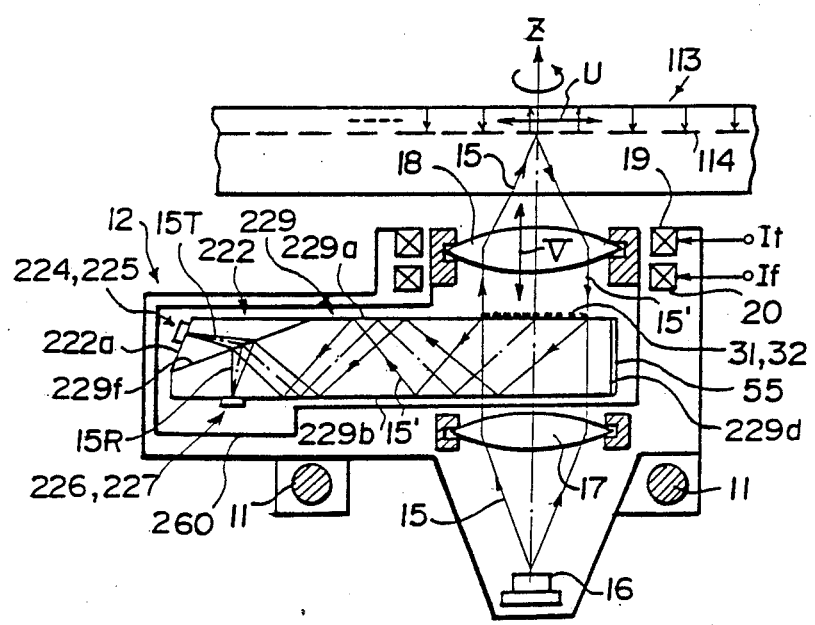

Another embodiment of the second pickup apparatus for a magneto-optical recording medium in accordance with the present invention will hereinbelow be described with reference to FIG. 21. In this embodiment, the light guide 229 and the objective lens 18 are secured to a single head 260, and the head 260 is supported moveably in the tracking direction and in the focusing direction with respect to the block 12. The head 260 is moved by the tracking coil 19 and the focusing coil 20. In this manner, tracking control can be carried out more accurately as in the embodiment shown in FIGS. 7 and 14.

Figure 22:
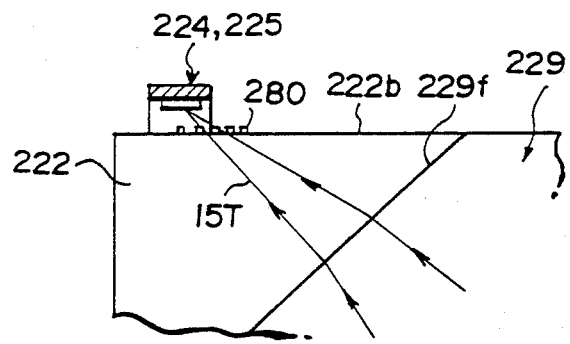
FIG. 22 is a side view showing an example of the photodetector used in the second pickup apparatus for a magneto-optical recording medium in accordance with the present invention.

In the aforesaid five embodiments shown in FIGS. 16 to 21, the first photodetector 224 and the second photodetector 225 are provided on the obliquely cut edge face 222a of the light-permeable member 222. However, the photodetectors 224 and 225 may be provided in any other manner on the light-permeable member 222. For example, as shown in FIG. 22, the photodetectors 224 and 225 may be disposed close to a surface 222b of the light-permeable member 222. Also, in this case, a diffraction grating 280 for radiating the guided light beam 15T, 15t out of the light-permeable member 222 may be provided on the surface 222b of the light-permeable member 222, and the guided light beam 15T, 15T radiated out of the light-permeable member 222 may be received by the photodetectors 224 and 225. This modification may be employed also for the provision of the photodetectors 226 and 227 on the surface 229b of the light guide 229.

I claim:
1. An optical pickup apparatus comprising:
   (i) a light source for irradiating a light beam onto a surface of an optical recording medium,
   (ii) an objective lens for converging said light beam onto the reflection surface of said optical recording medium,
   (iii) a light guide disposed in such a direction that one surface thereof receives the light beam reflected by said optical recording medium,
   (iv) a focusing grating provided at an incidence position of said reflected light beam on one surface of said light guide for making said reflected light beam enter said light guide in such a direction that said reflected light beam advances toward an edge face of said light guide by repetition of total reflection between said one surface of said light guide and the other surface of said light guide facing said one surface, and converging the light beam thus guided and advancing inside of said light guide,
   (v) a photodetector secured to the surface or the edge face of said light guide for detecting said guided light beam converged by said focusing grating,
   (vi) an error detection circuit for carrying out detection of tracking error and detection of focusing error on the basis of an output of said photodetector, and (vii) a signal detection circuit for detecting signals recorded on said optical recording medium on the basis of the output of said photodetector.

2. An optical pickup apparatus as defined in claim 1 wherein said focusing grating comprises a first focusing grating and a second focusing grating disposed side by side on said one surface of said light guide so that an axis passing through approximately the center of said reflected light beam and extending approximately normal to a tracking direction intervenes between said first focusing grating and said second focusing grating, said first focusing grating and said second focusing grating respectively converging the light beams, which are guided and advance inside of said light guide, to positions spaced from each other with said axis intervening therebetween, and said photodetector comprises a first-set photodetector composed of two photodetectors divided from each other and a second-set photodetector composed of two photodetectors divided from each other, said first-set photodetector and said second-set photodetector respectively detecting said guided light beam coverged by said first focusing grating and said guided light beam converged by said second focusing grating so that detection of tracking error can be effected by a push-pull technique and detection of focusing error can be effected by a Foucault technique.

3. An optical pickup apparatus as defined in claim 1 wherein said focusing grating is constituted by an astigmatism grating, and said photodetector comprises four photodetectors divided from one another and disposed so that detection of tracking error can be effected by a heterodyning technique and detection of focusing error can be effected by an astigmatism technique.

4. An optical pickup apparatus as defined in claim 1 wherein said light guide is disposed between said light source and said objective lens.

5. An optical pickup apparatus as defined in claim 1 wherein said light guide is disposed to reflect said light beam emitted by said light source and to make said light beam advance toward said optical recording medium.

6. An optical pickup apparatus as defined in any of claims 1 to 5 wherein said light guide and said objective lens are disposed independently of each other, and said objective lens alone is moved for the purposes of tracking control and focusing control.

7. An optical pickup apparatus as defined in any of claims 1 to 5 wherein said light guide is combined integrally with said objective lens and is moved together with said objective lens for the purposes of tracking control and focusing control.

8. A pickup apparatus for a magneto-optical recording medium, which comprises:

(i) a light source for irradiating a linearly polarized light beam onto a surface of a magneto-optical recording medium, (ii) an objective lens for converging said light beam onto the reflection surface of said magneto-optical recording medium, (iii) a light guide disposed in such a direction that one surface thereof receives the light beam reflected by said magneto-optical recording medium, (iv) a first focusing grating and a second focusing grating disposed side by side at an incidence position of said reflected light beam on one surface of said light guide so that an axis passing through approximately the center of said reflected light beam and extending on said one surface of said light guide approximately normal to a tracking direction intervenes between said first focusing grating and said second focusing grating, said first focusing grating and said second focusing grating respectively making said reflected light beam enter said light guide in such a direction that said reflected light beam advances toward an edge face of said light guide by repetition of total reflection between said one surface of said light guide and the other surface of said light guide facing said one surface, and respectively converging the light beams, which are thus guided and advance inside of said light guide, to positions spaced from each other with said axis intervening therebetween, (v) a light-permeable member composed of a uniaxial anisotropic crystal and provided in optical paths of said guided light beams advancing by repetition of total reflection inside of said light guide, said light-permeable member having a beam passage surface oblique with respect to directions of advance of said guided light beams, thereby to split a p-polarized light component and a s-polarized light component of each of said guided light beams into optical paths different from each other, (vi) a photodetector secured to the surface or the edge face of said light guide for detecting at least the p-polarized light component or the s-polarized light component of each of said guided light beams converged by said first focusing grating and said second focusing grating, (vii) an error detection circuit for carrying out detection of tracking error and detection of focusing error on the basis of an output of said photodetector, and (viii) a signal detection circuit for detecting signals recorded on said magneto-optical recording medium on the basis of the output of said photodetector.

9. A pickup apparatus for a magneto-optical recording medium as defined in claim 8 wherein a first photodetector and a second photodetector for detecting the p-polarized light components of said guided light beams converged by said first focusing grating and said second focusing grating respectively are provided, a third photodetector and a fourth photodetector for detecting the s-polarized light components of said guided light beams converged by said first focusing grating and said second focusing grating respectively are provided, and said signal detection circuit carries out differential detection of said signals on the basis of a difference between a sum of outputs of said first photodetector and said second photodetector, and a sum of outputs of said third photodetector and said fourth photodetector.

10. A pickup apparatus for a magneto-optical recording medium as defined in claim 9 wherein each of said first photodetector, said second photodetector, said third photodetector and said fourth photodetector is composed of two photodetectors divided from each other by a gap extending approximately parallel with a plane, on which said axis lies and which is normal to said one surface of said light guide, so that detection of tracking error can be effected by a push-pull technique and detection of focusing error can be effected by a Foucault technique.

11. A pickup apparatus for a magneto-optical recording medium as defined in claim 8 wherein said light guide is disposed so that a direction of polarization of said guided light beam impinging upon said light-permeable member is inclined at an angle of approximately 45° with respect to an optical axis of said uniaxial anisotropic crystal of said light-permeable member.

12. A pickup apparatus for a magneto-optical recording medium as defined in claim 8 wherein said light guide is disposed between said light source and said objective lens.

13. A pickup apparatus for a magneto-optical recording medium an defined in claim 8 wherein said light guide is disposed to reflect said light beam emitted by said light source and to make said light beam advance toward said reflection surface of said magneto-optical recording medium.

14. A pickup apparatus for a magneto-optical recording medium as defined in any of claims 8 to 13 wherein said light guide and said objective lens are disposed independently of each other, and said objective lens alone is moved for the purposes of tracking control and focusing control.

15. A pickup apparatus for a magneto-optical recording medium as defined in any of claims 8 to 13 wherein said light guide is combined integrally with said objective lens and is moved together with said objective lens for the purposes of tracking control and focusing control.

16. A pickup apparatus for a magneto-optical recording medium, which comprises:
   (i) a light source for irradiating a linearly polarized light beam onto a surface of a magneto-optical recording medium,
   (ii) an objective lens for converging said light beam onto the reflection surface of said magneto-optical recording medium,
   (iii) a light guide disposed in such a direction that one surface thereof receives the light beam reflected by said magneto-optical recording medium,
   (iv) a first focusing grating and a second focusing grating disposed side by side at an incidence position of said reflected light beam on one surface of said light guide so that an axis passing through approximately the center of said reflected light beam and extending on said one surface of said light guide approximately normal to a tracking direction intervenes between said first focusing grating and said second focusing grating, said first focusing grating and said second focusing grating respectively making said reflected light beam enter said light guide in such a direction that said reflected light beam advances toward an edge face of said light guide by repetition of total reflection between said one surface of said light guide and the other surface of said light guide facing said one surface, and respectively converging the light beams, which are thus guided and advance inside of said light guide, to positions spaced from each other with said axis intervening therebetween,
   (v) a light guide edge face formed in such a direction that said guided light beams advancing by repetition of total reflection inside of said light guide are incident at the Brewster angle upon said light guide edge face,
   (vi) a plurality of photodetectors for detecting at least the two guided light beams passing through said light guide edge face, or the two guided light beams reflected by said light guide edge face,
   (vii) an error detection circuit for carrying out detection of tracking error and detection of focusing error on the basis of outputs of said photodetectors, and
   (viii) a signal detection circuit for detecting signals recorded on said magneto-optical recording medium on the basis of the outputs of said photodetectors.

17. A pickup apparatus for a magneto-optical recording medium as defined in claim 16 wherein a first photodetector and a second photodetector for detecting said two guided light beams passing through said light guide edge face respectively are provided,
   a third photodetector and a fourth photodetector said two guided light beams reflected by said light guide edge face respectively are provided,
   said error detection circuit carries out detection of tracking error and detection of focusing error on the basis of outputs of said first photodetector, said second photodetector, said third photodetector and said fourth photodetector, and
   said signal detection circuit detects said signals on the basis of a sum of outputs of said third photodetector and said fourth photodetector.

18. A pickup apparatus for a magneto-optical recording medium as defined in claim 17 wherein each of said first photodetector, said second photodetector, said third photodetector and said fourth photodetector is composed of two photodetectors divided from each other by a gap extending approximately parallel with a plane, on which said axis lies and which is normal to said one surface of said light guide, so that detection of tracking error can be effected by a push-pull technique and detection of focusing error can be effected by a Foucault technique.

19. A pickup apparatus for a magneto-optical recording medium as defined in claim 16 wherein said light guide is disposed between said light source and said objective lens.

20. A pickup apparatus for a magneto-optical recording medium as defined in claim 16 wherein said light guide is disposed to reflect said light beam emitted by said light source and to make said light beam advance toward said reflection surface of said magneto-optical recording medium.

21. A pickup apparatus for a magneto-optical recording medium as defined in any of claims 16 to 20 wherein said light guide and said objective lens are disposed independently of each other, and said objective lens alone is moved for the purposes of tracking control and focusing control.

22. A pickup apparatus for a magneto-optical recording medium as defined in any of claims 16 to 20 wherein said light guide is combined integrally with said objective lens and is moved together with said objective lens for the purposes of tracking control and focusing control.

* * * * *